(12) United States Patent
Shunli et al.

(10) Patent No.: US 9,714,047 B1
(45) Date of Patent: Jul. 25, 2017

(54) PALLET TRUCK HAVING A SELECTIVE TURNING RADIUS

(71) Applicant: Big Lift, LLC, Lombard, IL (US)

(72) Inventors: Liu Shunli, Hangzhou (CN); Weng Lijian, Hangzhou (CN); Xu Minghui, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days.

(21) Appl. No.: 15/098,901

(22) Filed: Apr. 14, 2016

(30) Foreign Application Priority Data

Apr. 12, 2016 (CN) .......................... 2016 1 0224868

(51) Int. Cl.
 B62B 3/04 (2006.01)
 B62B 5/00 (2006.01)
(52) U.S. Cl.
 CPC .................................. B62B 5/0069 (2013.01)
(58) Field of Classification Search
 CPC ......... B62B 5/0069; B62B 3/04; B62B 3/001; B62B 3/06; B62B 3/0612; B62B 3/0618; B62F 9/065
 USPC ...................................................... 280/43.12
 See application file for complete search history.

(56) References Cited

U.S. PATENT DOCUMENTS

| | | | | | |
|---|---|---|---|---|---|
| 2,358,957 A | * | 9/1944 | Barrett | .................. | B62B 3/0625 254/10 C |
| 2,417,394 A | * | 3/1947 | Framhein | .............. | B62B 3/0612 180/13 |
| 2,422,538 A | * | 6/1947 | Framhein | .............. | B62B 3/0618 254/2 B |
| 2,469,638 A | * | 5/1949 | Framhein | .............. | B62B 3/0612 254/2 B |
| 2,550,548 A | * | 4/1951 | Framhein | .................. | B62B 3/06 254/10 C |
| 3,246,713 A | * | 4/1966 | Nichols | .................. | B62B 3/0612 180/13 |
| 3,441,287 A | * | 4/1969 | Leadbeater | ........... | B62B 3/0612 280/43.12 |
| 3,462,167 A | * | 8/1969 | Rateau | .................. | B62B 3/0618 280/43.12 |
| 3,525,501 A | * | 8/1970 | Goetz | ....................... | B62B 3/06 254/2 R |
| 3,601,423 A | * | 8/1971 | Goodacre | ............. | B62B 3/0612 280/43.12 |
| 3,836,165 A | * | 9/1974 | Sato | ..................... | B62B 3/0612 254/2 R |
| 3,938,608 A | | 2/1976 | Folco-Zambelli | | |

(Continued)

Primary Examiner — J. Allen Shriver, II
Assistant Examiner — Brian Cassidy
(74) Attorney, Agent, or Firm — Cook Alex Ltd.

(57) ABSTRACT

The disclosure provides pallet trucks having a selective turning radius. The pallet trucks include load wheel systems having at least two load wheel assemblies below each fork. A forward load wheel assembly is located near the forward end of the fork and a central load wheel assembly is located near the center of a central portion of the fork. A first turning radius is defined by the distance between the forward load wheel assembly and a directionally adjustable rear wheel when the forward load wheel assembly supports the fork. The central load wheel assembly may be selectively deployed to lift and support the fork to yield a second, shorter turning radius defined by the distance between the central load wheel assembly and the directionally adjustable rear wheel.

13 Claims, 15 Drawing Sheets

(56) References Cited

U.S. PATENT DOCUMENTS

| | | | | |
|---|---|---|---|---|
| 3,982,767 A * | 9/1976 | Larsson | B62B 3/06 | 254/2 C |
| 4,027,771 A * | 6/1977 | Adams | B62B 3/0625 | 280/43.12 |
| 4,497,501 A * | 2/1985 | Kedem | B62B 3/0618 | 254/2 R |
| 4,969,794 A * | 11/1990 | Larsen | B62B 3/0618 | 280/43.12 |
| 5,354,080 A * | 10/1994 | Jones | B62B 3/0612 | 254/2 C |
| 5,403,024 A * | 4/1995 | Frketic | B62B 3/06 | 280/43.12 |
| 6,021,869 A * | 2/2000 | Fischer | B62B 3/06 | 187/231 |
| 6,616,395 B2 * | 9/2003 | Fransson | B60G 17/0272 | 187/222 |
| 6,808,357 B2 * | 10/2004 | Lee | B62B 3/06 | 414/495 |
| 6,830,114 B2 | 12/2004 | Hammonds | | |
| 7,475,887 B2 | 1/2009 | Hartmann et al. | | |
| 8,668,208 B2 * | 3/2014 | Larringan | B62B 3/06 | 280/43 |
| 8,950,759 B2 * | 2/2015 | Thorsen | B62B 3/02 | 280/43.12 |
| 9,458,001 B2 * | 10/2016 | Keen | B62B 3/0618 | |
| 9,475,513 B2 * | 10/2016 | Liu | B62B 3/0612 | |
| 9,505,595 B1 * | 11/2016 | Smith | B66F 9/075 | |
| 2013/0127126 A1 * | 5/2013 | Lantz | B66F 9/0755 | 280/43.12 |
| 2013/0277929 A1 * | 10/2013 | Thorsen | B62B 3/02 | 280/43.12 |
| 2015/0014948 A1 * | 1/2015 | Keen | B62B 3/0618 | 280/43.12 |
| 2015/0102274 A1 * | 4/2015 | He | B62B 3/0618 | 254/2 C |

* cited by examiner

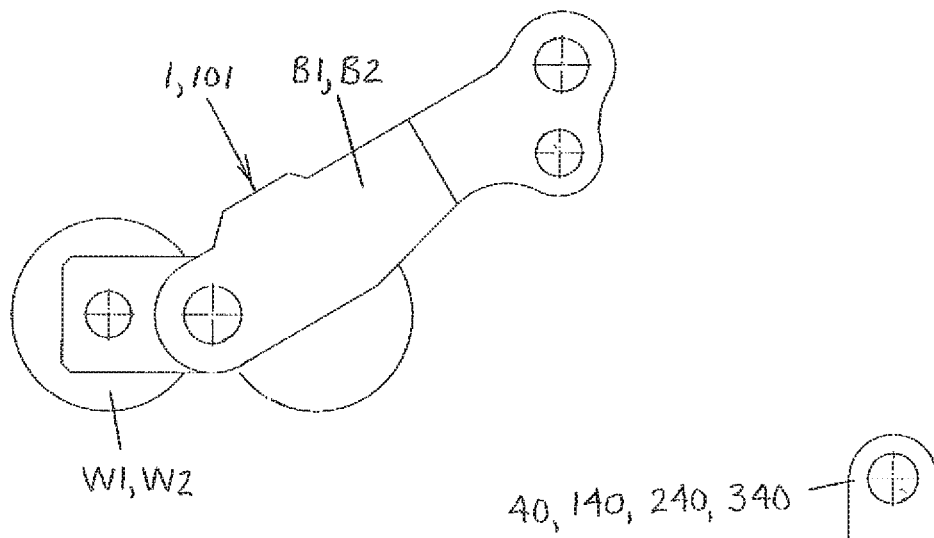
Figure 5
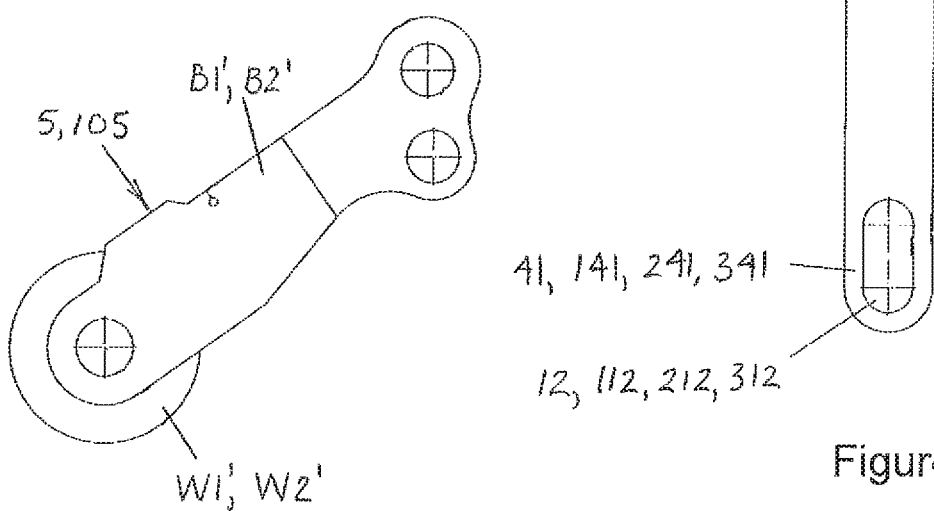
Figure 6
Figure 7

PALLET TRUCK HAVING A SELECTIVE TURNING RADIUS

CROSS-REFERENCE TO RELATED APPLICATION

This is application claims priority to Chinese Patent Application No. 201610224868.9 filed Apr. 12, 2016, which is hereby incorporated by reference in its entirety.

TECHNICAL FIELD

The invention relates to mechanisms for reducing the turning radius of a pallet truck, in particular mechanisms for selecting alternative load wheels below the forks about which the pallet truck will pivot when turning.

BACKGROUND

At present, pallet trucks having forks generally also have load wheel systems that include load wheel assemblies having one or more wheels and being provided in a single location below the forward ends of the forks. The load wheel assemblies are used to raise and lower the forks and to support the forks while rolling over a ground surface, floor, platform or the like (collectively hereinafter referred to as a "ground surface"). The lifting of the forks generally is accomplished with a load wheel assembly that is activated by pushing or pulling of arms below the forks. The pushing or pulling of the arms generally is driven by linkage that is activated by movement in relation to the lifting position of a lift cylinder that causes lifting of a pallet truck load lift portion relative to a base support portion. Turning of a typical pallet truck is initiated at the rear when a rear wheel that is directionally adjustable (a steering wheel) is turned in a direction to the left or right.

When using a rear directionally adjustable wheel to determine the direction of a turn, a load wheel assembly below a forward end of one of the forks generally serves as a pivot about which the rear of the pallet truck turns. As such, the minimum turning radius for a typical pallet truck may be defined by the distance between the rear wheel and the forward load wheel assembly about which the pallet truck pivots when turning. Thus, the rear of the pallet truck would sweep through a circle having a diameter that is at least twice the distance between the rear wheel and the location where the forward load wheel assembly engages the ground surface. This causes the diameter of the circle to be nearly twice the length of the entire pallet truck. Such an arrangement greatly inhibits the efficiency of a pallet truck, because a relatively large turning radius impairs maneuverability and tends to limit the areas through which the pallet truck may travel, turn around and otherwise maneuver. In addition, having a longer fork length configuration generally disadvantageously influences the turning radius of a pallet truck because the load wheel assemblies below the forward ends of the forks tend to be positioned a greater distance from the rear directionally adjustable wheel, resulting in a larger turning radius and compounding the inconvenience of operating the pallet truck.

SUMMARY

The subject matter of this disclosure provides advantages over the structures of typical prior art pallet trucks that have only one load wheel assembly in a single, predetermined location below a forward end of each fork. In contrast, the present disclosure provides example mechanisms having at least two load wheel assemblies below each fork: a forward load wheel assembly generally located near the forward end of the fork, which may be similar to the forward position used on prior art pallet trucks, and a central load wheel assembly generally located in a position near the center of a central portion of each fork, between the forward load wheel assembly and the directionally adjustable rear wheel of the pallet truck.

This improved configuration permits a reduction in turning radius for a pallet truck when each central load wheel assembly is deployed, by moving it to a position where it lifts and supports a fork. Indeed, this configuration is able to provide a pallet truck that can pivot about an axis that permits the pallet truck to effectively turn around within a circle having a diameter that is the length of the pallet truck. As such, some in the art may refer to such a pallet truck as having a "zero" turning radius. Depending on how one defines the turning radius, the pallet truck could still be said to have a turning radius that is defined by the distance between the central load wheel assembly and the rear wheel. However, reference to a "zero" turning radius likely may be associated with the additional space beyond the front of the pallet truck which would be needed to make a complete 360 degree turn. With a typical prior art pallet truck, the space needed would extend forward from the front of the pallet tuck by nearly the length of the entire pallet truck, because the pallet truck would pivot about a forward load wheel assembly. However, with the present apparatus, the configuration may be established to require no additional space forward of the pallet truck when turning through a complete circle, because the pallet truck is able to turn around within the length of the space it already occupies.

In a first aspect, the disclosure provides a load wheel system for a fork of a pallet truck, wherein the fork has a rearward end, a forward end and a central portion extending between the rearward end and the forward end. The load wheel system includes a forward load wheel assembly having a pivotal connection to the fork near the forward end of the fork, a central load wheel assembly having a pivotal connection to the fork near a center of the central portion of the fork, a first activation arm extending forward and rearward of the central load wheel assembly and having a pivotal connection to the forward load wheel assembly at a position spaced from the pivotal connection of the forward load wheel assembly to the fork, a second activation arm having a pivotal connection coupled to the first activation arm at a first end and a slot at a second end, and the slot at the second end of the second activation arm being slidably and pivotally coupled to the central load wheel assembly at a position spaced from the pivotal connection of the central load wheel assembly to the fork.

In another aspect, the disclosure provides a pallet truck having a selective turning radius. The pallet truck includes a base support portion and a load lift portion connected to and extending forward of the base support portion, a wheel rotatably connected to the base support portion and being directionally adjustable, the load lift portion including at least one fork having a rearward end, a forward end and a central portion extending between the rearward end and the forward end, and a load wheel system connected to the that least one fork. The load wheel system further includes a forward load wheel assembly having a pivotal connection to the at least one fork near the forward end of the at least one fork, a central load wheel assembly having a pivotal connection to the at least one fork near a center of the central portion of the at least one fork, a first activation arm extending forward and rearward of the central load wheel assembly and having a pivotal connection to the forward load wheel assembly at a position spaced from the pivotal connection of the forward load wheel assembly to the at least one fork, a second activation arm having a pivotal connection coupled to the first activation arm at a first end and a slot at a second end, and the slot at the second end of the second activation arm being slidably and pivotally coupled to the central load wheel assembly at a position spaced from the pivotal connection of the central load wheel assembly to the at least one fork.

In a further aspect, the disclosure provides a load wheel system for a fork of a pallet truck, wherein the fork has a rearward end, a forward end and a central portion extending between the rearward end and the forward end. The load wheel system includes a forward load wheel assembly having a pivotal connection to the fork near the forward end of the fork, a central load wheel assembly having a pivotal connection to the fork near a center of the central portion of the fork, a first activation arm extending forward and rearward of the central load wheel assembly and having a pivotal connection to the forward load wheel assembly, a second activation arm coupled to the first activation arm and coupled to the central load wheel assembly, and wherein a first movement of the first activation arm causes the forward load wheel assembly to lift and support the fork, and a second movement of the first activation arm causes the second activation arm to move the central load wheel assembly to lift and support the fork.

Thus, the present disclosure presents alternatives to prior art pallet truck apparatus and provides advantageous features by employing load wheel systems that include a central load wheel assembly that may be selectively deployed to yield a second, shorter turning radius, greatly improving the convenience, utility and efficiency in operating a pallet truck. It is to be understood that both the foregoing general description and the following detailed description are exemplary and provided for purposes of explanation only, and are not restrictive with respect to the claimed subject matter. Further features and advantages will become more fully apparent in the following description of the example preferred embodiments and from the appended claims.

BRIEF DESCRIPTION OF THE DRAWINGS

In describing the preferred examples, references are made to the accompanying drawing figures wherein like parts have like reference numerals. For ease of viewing and comprehension, several of the figures show less than an entire pallet truck or show only particular components of the pallet truck.

FIG. 5 is a schematic side view of a forward load wheel assembly of the first and second example pallet truck load wheel systems of FIGS. 1 and 3.

FIG. 6 is a schematic side view of a central load wheel assembly of the first and second example pallet truck load wheel systems of FIGS. 1 and 3.

FIG. 7 is a schematic side view of a second activation arm of the first and second example pallet truck load wheel systems of FIGS. 1 and 3.

It should be understood that the drawings are not necessarily to scale. While some mechanical details of pallet trucks, including some details of fastening or connecting means and other plan and section views of the particular components have been omitted, such details are considered to be within the comprehension of those skilled in the art in light of the present disclosure. It also should be understood that the present disclosure is not limited to the examples illustrated.

DETAILED DESCRIPTION OF THE PREFERRED EMBODIMENTS

This disclosure provides solutions to the technical problem presented by a relatively large turning radius of a typical prior art pallet truck. The disclosure teaches pallet truck load wheel systems having a forward load wheel assembly and a central load wheel assembly, which may be embodied in several forms. In fact, examples of two general types of systems are provided, with two alternative example load wheel systems for pallet trucks shown for each type. These load wheel systems are described further herein with reference to the accompanying drawing FIGS. 1-20 of the preferred embodiments. The two types of systems differ with respect to whether a first activation arm is pulled or pushed to cause the load wheel systems to lift the forks of a pallet truck. The two examples of each type further differ as to the position of the coupling of a second activation arm to a first activation arm within the system. It will be appreciated, however, that the invention may be constructed and configured in various ways and is not limited to the specific examples in the form of the preferred embodiments shown and described herein.

A first example pallet truck load wheel system L1 is shown in FIGS. 1, 2 and 5-7. The load wheel system L1 may be used in a pallet truck to provide a selective turning radius. Thus, the pallet truck may be configured to have two or more turning radii from which to select, depending on which would be more convenient in a given environment. The first example load wheel system L1 is shown in a configuration that happens to provide a first turning radius that would be similar to that of a typical pallet truck, but then also provides for selective use of a second significantly reduced turning radius.

Figure 14:
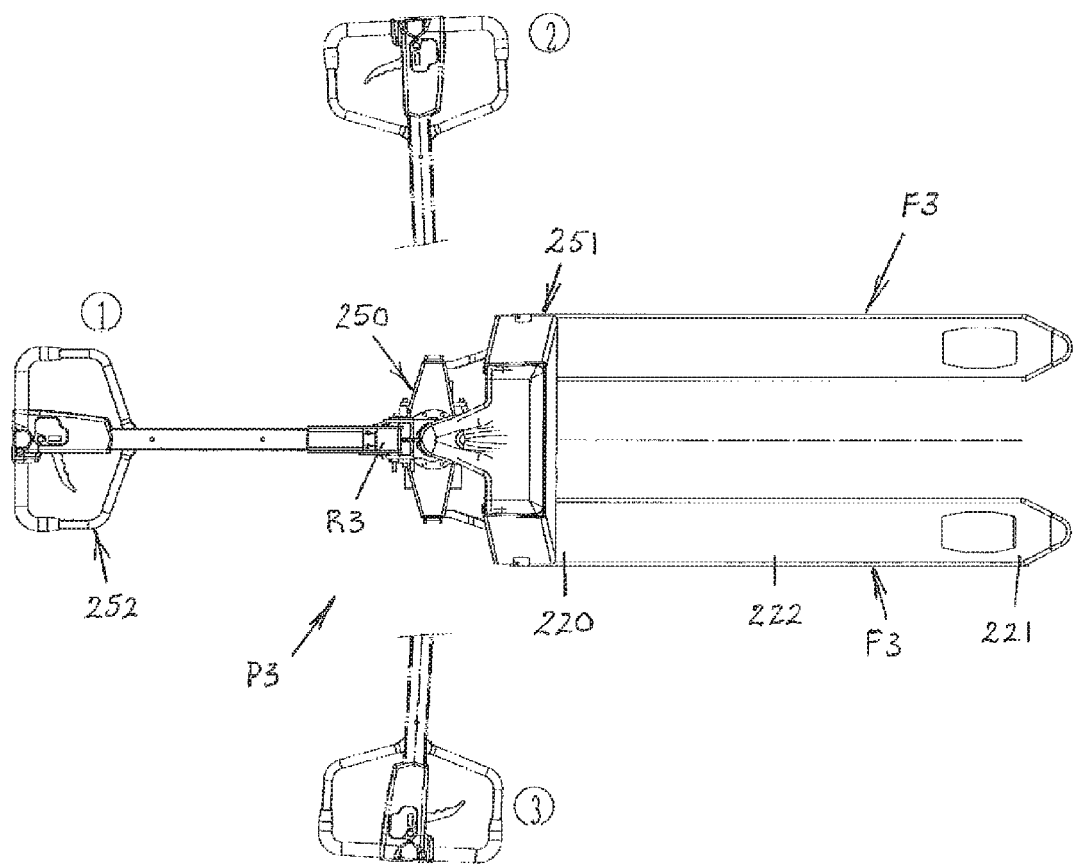
FIG. 14 is a schematic top view of a pallet truck having the third example pallet truck load wheel system of FIG. 8 and showing example handle steering positions.
Figure 15:
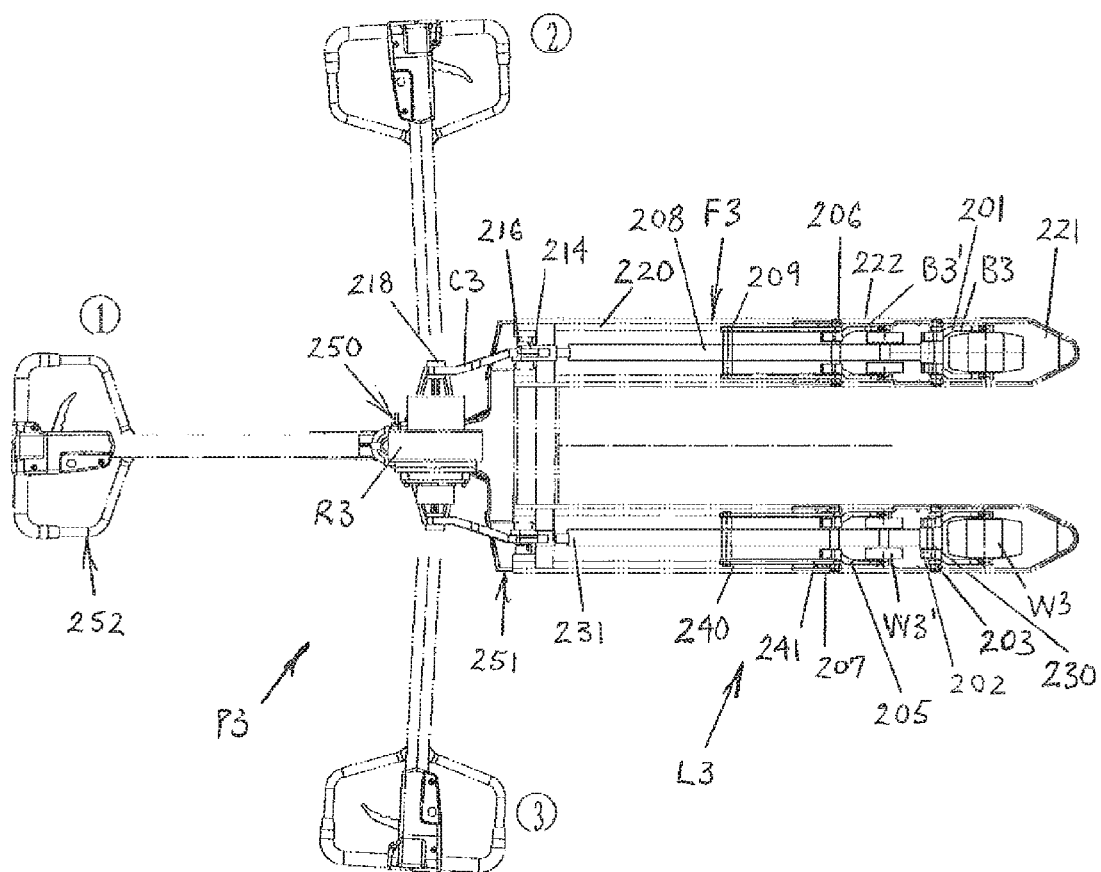
FIG. 15 is a schematic bottom view of the pallet truck of FIG. 14 showing example steering handle positions.
Figure 16:
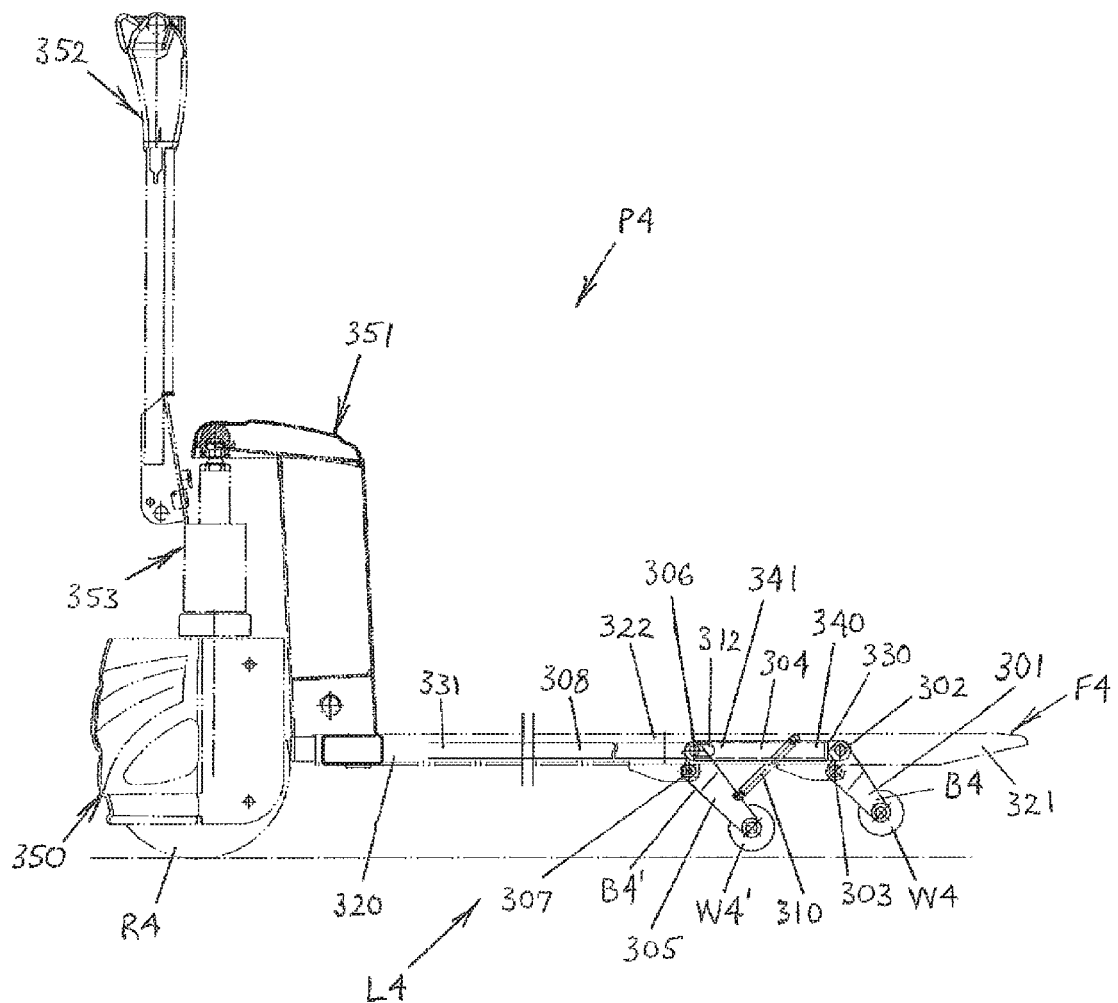
FIG. 16 is a schematic side view of a pallet truck that includes the fourth example pallet truck load wheel system of FIG. 10.

The first example pallet truck load wheel system L1 is shown relative to a portion of a pallet truck, but it will be understood upon review of this entire disclosure that the remainder of the pallet truck may be represented by other components that would be in common with the pallet truck P3 shown in FIGS. 14 and 15, and pallet truck P4 in FIGS. 16-20. The first example pallet truck load wheel system L1 is for use with a fork F1 of a pallet truck, where the fork F1 has a rearward end 20, a forward end 21 and a central portion 22 extending between the rearward end 20 and the forward end 21. The load wheel system L1 includes a forward load wheel assembly 1 having a bracket B1 and one or more load wheels W1 rotatably connected to the bracket B1 at a first end. The forward load wheel assembly 1 is coupled to the fork F1 by a pivotal connection to the fork F1 near the forward end 21 of the fork F1. The coupling is by a pivotal connection of the forward load wheel assembly 1 to the fork F1 at a pin or shaft 3 at a second end of the bracket B1.

The load wheel system L1 also has a central load wheel assembly 5 having a bracket B1' and one or more load wheels W1' rotatably connected to the bracket B1' at a first end. The central load wheel assembly 5 is coupled to the fork F1 by a pivotal connection to the fork F1 near a center of the central portion 22 of the fork F1. The coupling is by a pivotal connection of the central load wheel assembly 5 to the fork F1 at a pin or shaft 7 at a second end of the bracket B1'.

The load wheel system L1 further includes a first activation arm 8 extending forward and rearward of the central load wheel assembly 5 and having a forward end 30 and a rearward end 31. The first activation arm 8 is coupled to the forward load wheel assembly 1 via a pivotal connection to the forward load wheel assembly 1 at a forward end 30 of the first activation arm 8 at a pin or shaft 2 located at an intermediate position along the bracket B1, which is spaced from the pivotal connection of the forward load wheel assembly 1 to the fork F1 at the pin or shaft 3.

Figure 1:
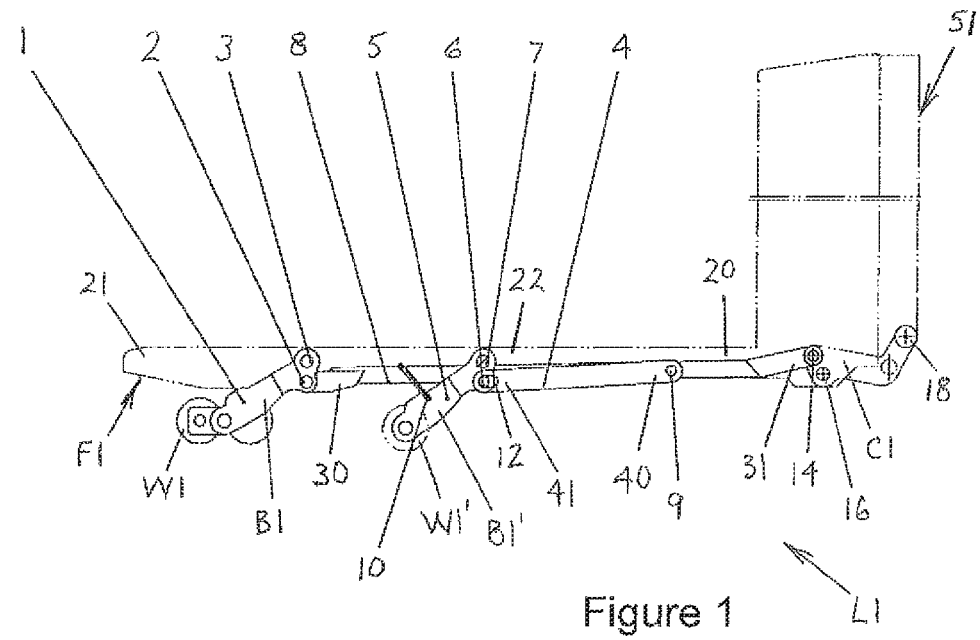
FIG. 1 is a schematic side view of a first example pallet truck load wheel system for a pallet truck having a selective turning radius, with other structures removed for ease of viewing.

The load wheel system L1 also includes a second activation arm 4 having a first end 40 and an opposed second end 41. The second activation arm 4 is coupled to the first activation arm 8 at the first end 40 by a pivotal connection at the pin or shaft 9, and has a slot 12 at the second end 41. The slot 12 at the second end 41 of the second activation arm 4 is slidably and pivotally coupled to the central load wheel assembly 5 at a pin or shaft 6 located at an intermediate position along the bracket B1', which is spaced from and below the pivotal connection of the central load wheel assembly 5 to the fork F1 at the pin or shaft 7. The rearward end 31 of the first activation arm 8 is pivotally connected to a crank link C1 at a pin or shaft 14. The crank link C1 has a pivotal connection to a load lift portion 51 of a pallet truck. The pivotal connection of the crank link C1 to the load lift portion 51 is at a pin or shaft 16, and the rear of the crank link C1 has a further pivotal connection to a base support portion of the pallet truck at a pin or shaft 18. In FIG. 1, as the load lift portion 51 is raised by a lift cylinder relative to the base support portion of the pallet truck, the crank link C1 rotates clockwise and pulls the first activation arm 8 to cause lifting of the fork F1.

An operator of the pallet truck may cause movement of the crank link C1, such as by pushing a button or otherwise providing an input to a controller, so as to select actuation of a load lift cylinder to lift or lower the rear of the load lift portion 51 relative to a rear base support portion having a rear wheel that is directionally adjustable. Operation of the lift cylinder within a first preselected upward and downward range limits rotation of the crank link C1, which will move the first activation arm 8 and force the forward load wheel assembly 1 to pivot and correspondingly raise or lower the fork F1. When lowering the lift cylinder, the crank link C1 pushes the first activation arm 8 forward, forcing the forward wheel assembly 1 to pivot forward and upward toward the fork F1, thereby lowering the fork F1 toward the ground surface. When the lift cylinder is raised, the crank link C1 moves the first activation arm 8 rearward, which pivots the forward wheel assembly 1 rearward and downward, thereby lifting and supporting the fork F1 above the ground surface.

A biasing element 10, such as a spring, is connected to and biases the central load wheel assembly 5 upward toward the fork F1, to a return or raised position. The biasing element 10 has a first end connected to the central load wheel assembly 5 and a second end connected to the fork F1. When supported by the forward load wheel assembly 1, the pallet truck has a turning radius that is dependent upon the distance between the directionally adjustable rear wheel of the pallet truck and a wheel W1 of the forward load wheel assembly 1, which will provide the pivot about which the pallet truck turns.

In this first example, the first end 40 of the second activation arm 4 has a pivotal connection coupled to the first activation arm 8 at the pin or shaft 9, which is at a position spaced rearward of the pivotal connection of the central load wheel assembly 5 to the fork F1 at the pin or shaft 7. The second activation arm 4 moves with the first activation arm 8 at the pin or shaft 9. The operator is able to selectively cause further rotation of the crank link C1, such as by pushing a button or otherwise providing an input to a controller, so as to select further actuation of the lift cylinder to cause a higher lift position, which causes the crank link C1 to rotate further, in turn forcing the first activation arm 8 to exceed the regular lifting stroke necessary to pivot the forward load wheel assembly 1 rearward and downward to lift the fork F1. When this happens, the second activation arm 4 is pulled further rearward until the pin or shaft 6 on the central load wheel assembly 5 has moved within the slot 12 at the second end 41 and causes the second activation arm 4 to pivot the central load wheel assembly 5 rearward and downward, so that both the central load wheel assembly 5 and the forward load wheel assembly 1 at least momentarily engage the ground surface and support the fork F1. The biasing element 10 is stretched as this pivoting of the central load wheel assembly 5 occurs. As the first activation arm 8 continues to move further rearward, the second activation arm 4 is moved until the central load wheel assembly 5 has pivoted to a position in which the central load wheel assembly 5 supports the fork F1 on the ground surface, the biasing element 10 is stretched, and the forward load wheel assembly 1 hangs from the fork F1, because it has a shorter effective length than the central load wheel assembly 5.

It will be appreciated that for all of the examples of load wheel systems described herein it is preferable to equip each fork F1 with a forward load wheel assembly and a central load wheel assembly 5. Also, for proper load distribution, smooth rolling, turning and safe operation of such pallet trucks, it is preferable to operate the forward load wheel assemblies simultaneously, as well as to operate the central load wheel assemblies simultaneously.

Thus, with pulling movement of the first activation arm 8, the second activation arm 4 may be used to pull and pivot the central load wheel assembly 5 rearward and downward to deploy the central load wheel assembly 5 as the biasing element 10 is stretched. Indeed, the first activation arm 8 is movable to pivot the central load wheel assembly 5 to at least momentarily support the fork F1 on both the forward load wheel assembly 1 and the central load wheel assembly 5. The first activation arm 8 is further movable to pivot the central load wheel assembly 5 to lift and support the fork F1 on the central load wheel assembly 5. The central load wheel assembly 5 has a greater effective length than the forward load wheel assembly 1. The effective relative lengths and the pivot positions for the central load wheel assembly 5 and forward load wheel assembly 1 provide for greater vertical displacement of the fork F1 by the central load wheel assembly 5, once the first activation arm 8 causes the second activation arm 4 to force the central load wheel assembly 5 to pivot rearward and downward so as to engage the ground surface and lift the fork F1. This, in turn, will cause the forward load wheel assembly 1 to hang from the fork F1 and not engage the ground surface, thereby selectively resulting in a reduced turning radius as a wheel W1' of the central load wheel assembly 5 serves as the forward pivot about which the pallet truck turns. The shorter distance between the directionally adjustable rear wheel and the wheel W1' of the central load wheel assembly 5, when compared to the distance between the directionally adjustable rear wheel and the wheel W1 of the forward load wheel assembly 1, provides a smaller turning radius and greater maneuverability of the pallet truck.

Figure 2:
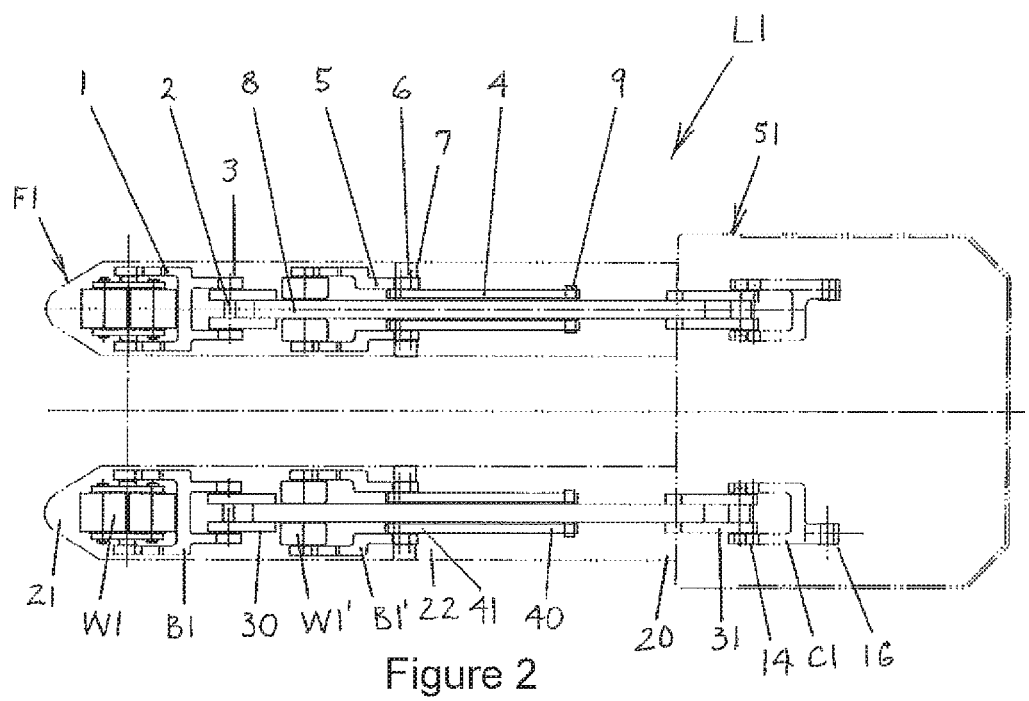
FIG. 2 is a schematic bottom view of the first example pallet truck load wheel system of FIG. 1.

It will be appreciated that the disclosure provides a first example of a pallet truck having a selective turning radius in FIGS. 1 and 2, in conjunction with the components shown more fully with the other examples. The pallet truck includes a base support portion and load lift portion 51 connected to and extending forward of the base support portion, and a wheel rotatably connected to the base support portion and being directionally adjustable. The load lift portion 51 includes at least one fork F1 having a rearward end 20, a forward end 21 and a central portion 22 extending between the rearward end 20 and the forward end 21, and a load wheel system L1 connected to the at least one fork F1. The load wheel system L1 further includes a forward load wheel assembly 1 coupled by a pivotal connection at the pin or shaft 3 to the at least one fork F1 near the forward end 21 of the at least one fork F1, and a central load wheel assembly 5 coupled by a pivotal connection at the pin or shaft 7 to the at least one fork F1 near a center of the central portion 22 of the at least one fork F1. The load wheel system L1 also includes a first activation arm 8 extending forward and rearward of the central load wheel assembly 5 and being coupled by a pivotal connection at the pin or shaft 2 to the forward load wheel assembly 1 at a position spaced from the pivotal connection at the pin or shaft 3 of the forward load wheel assembly 1 to the at least one fork F1, a second activation arm 4 being coupled by a pivotal connection at the pin or shaft 9 to the first activation arm 8 at a first end 40 and a slot 12 at a second end 41, and the slot 12 at the second end 41 of the second activation arm 4 being slidably and pivotally coupled to the central load wheel assembly 5 at the pin or shaft 6 spaced from the pivotal connection at the pin or shaft 7 of the central load wheel assembly 5 to the at least one fork F1.

In this first example, the first activation arm 8 is movable to pivot the forward load wheel assembly 1 to lift and support the at least one fork F1 on the forward load wheel assembly 1. It will be appreciated that when the at least one fork F1 is lifted and supported by the forward load wheel assembly 1, the pallet truck has a first turning radius relating to the distance between the wheel rotatably connected to the base support portion and the forward load wheel assembly 1. The first activation arm 8 is further movable to pivot the central load wheel assembly 5 to support the at least one fork F1 on both the forward load wheel assembly 1 and the central load wheel assembly 5. In addition, the first activation arm 8 is further movable to pivot the central load wheel assembly 5 to lift and support the at least one fork F1 on the central load wheel assembly 5. It further will be appreciated that when the at least one fork F1 is lifted and supported by the central load wheel assembly 5, the pallet truck has a second turning radius relating to the distance between the wheel rotatably connected to the base support portion and the central load wheel assembly 5. When the at least one fork F1 is lifted and supported by the central load wheel assembly 5, the forward load wheel assembly 1 hangs from the at least one fork F1. Also, to keep the central load wheel assembly 5 conveniently tucked out of the way when not in use, a biasing element 10 is configured to bias the central load wheel assembly 5 toward a raised position. In this first example, the biasing element 10 has a first end connected to the central load wheel assembly 5 and a second end connected to the at least one fork F1, although it will be appreciated that other configurations for a biasing element may be utilized. Alternatively, the load wheel system L1 may utilize a different mechanism to move the central load wheel assembly 5 to a raised position when it is not supporting the fork F1.

A second example pallet truck load wheel system L2 is shown in FIGS. 3-7. The load wheel system L2 may be used in a pallet truck to provide a selective turning radius. Thus, the pallet truck may be configured to have two or more turning radii from which to select, depending on which would be more convenient in a given environment. The second example load wheel system L2 is shown in a configuration that happens to provide a first turning radius that would be similar to that of a typical pallet truck, but then also provides for selective use of a second significantly reduced turning radius.

The second example pallet truck load wheel system L2 is shown relative to a portion of a pallet truck, but it will be understood upon review of this entire disclosure that the remainder of the pallet truck may be represented by other components that would be in common with the pallet truck P3 shown in FIGS. 14 and 15, and pallet truck P4 in FIGS. 16-20. The second example pallet truck load wheel system L2 is for use with a fork F2 of a pallet truck, where the fork F2 has a rearward end 120, a forward end 121 and a central portion 122 extending between the rearward end 120 and the forward end 121. The load wheel system L2 includes a forward load wheel assembly 101 having a bracket B2 and one or more load wheels W2 rotatably connected to the bracket B2 at a first end. The forward load wheel assembly 101 is coupled to the fork F2 by a pivotal connection to the fork F2 near the forward end 121 of the fork F2. The coupling is by a pivotal connection of the forward load wheel assembly 101 to the fork F2 at a pin or shaft 103 at a second end of the bracket B2.

The load wheel system L2 also has a central load wheel assembly 105 having a bracket B2' and one or more load wheels W2' rotatably connected to the bracket B2' at a first end. The central load wheel assembly 105 is coupled to the fork F2 by a pivotal connection to the fork F2 near a center of the central portion 122 of the fork F2. The coupling is by a pivotal connection of the central load wheel assembly 105 to the fork F2 at a pin or shaft 107 at a second end of the bracket B2'.

The load wheel system L2 further includes a first activation arm 108 extending forward and rearward of the central load wheel assembly 105 and having a forward end 130 and a rearward end 131. The first activation arm 108 is coupled to the forward load wheel assembly 101 via a pivotal connection to the forward load wheel assembly 101 at a forward end 130 of the first activation arm 108 at a pin or shaft 102 located at an intermediate position along the bracket B2, which is spaced from the pivotal connection of the forward load wheel assembly 101 to the fork F2 at the pin or shaft 103.

Figure 3:
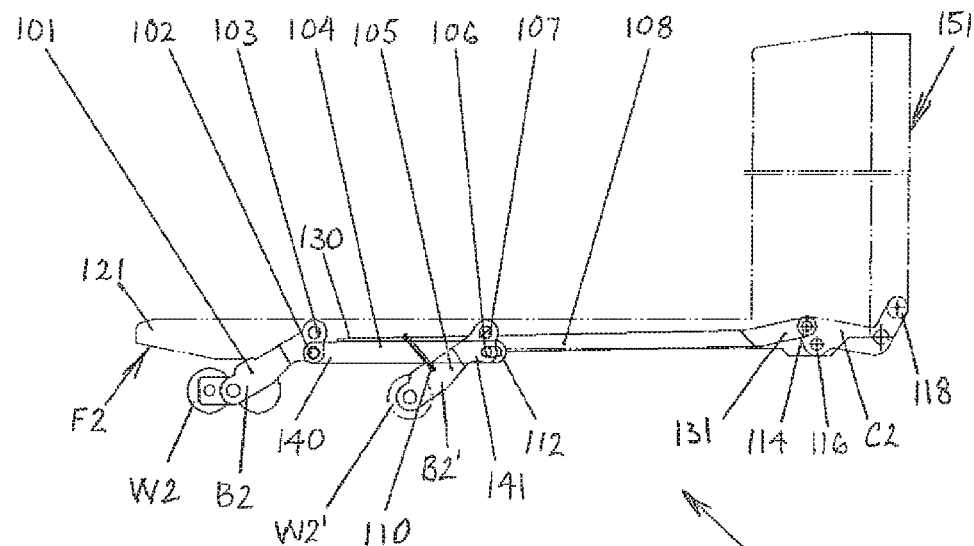
FIG. 3 is a schematic side view of a second example pallet truck load wheel system for a pallet truck having a selective turning radius, with other structures removed for ease of viewing.
Figure 4:
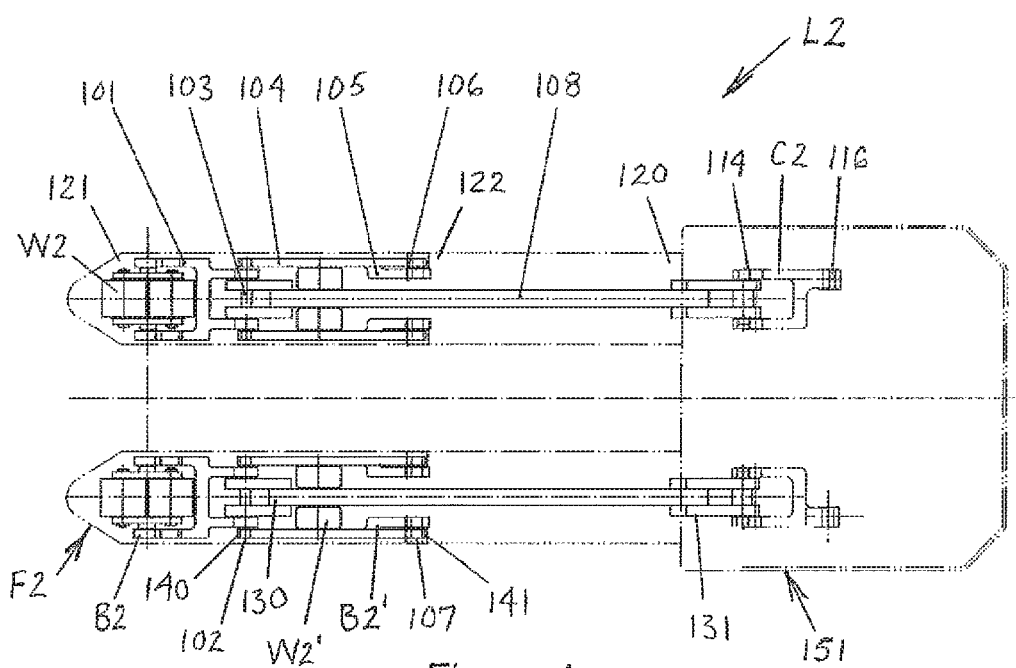
FIG. 4 is a schematic bottom view of the second example pallet truck load wheel system of FIG. 3.
Figure 8:
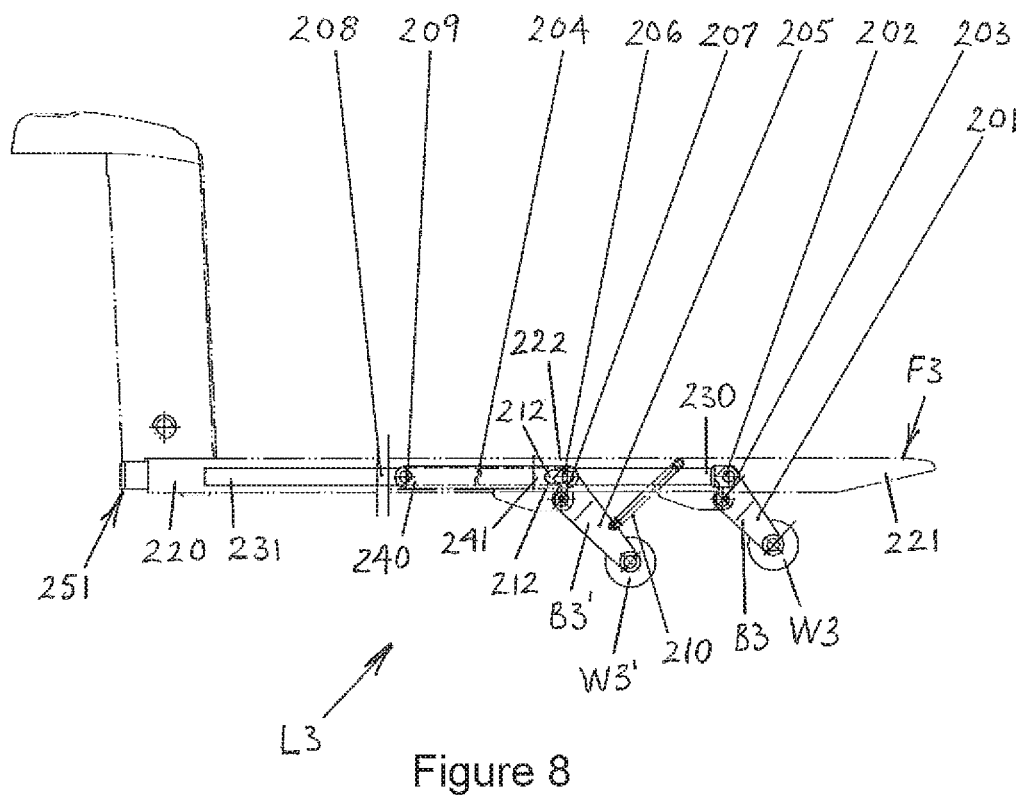
FIG. 8 is a schematic side view of a third example pallet truck load wheel system for a pallet truck having a selective turning radius, with other structures removed for ease of viewing.
Figure 9:
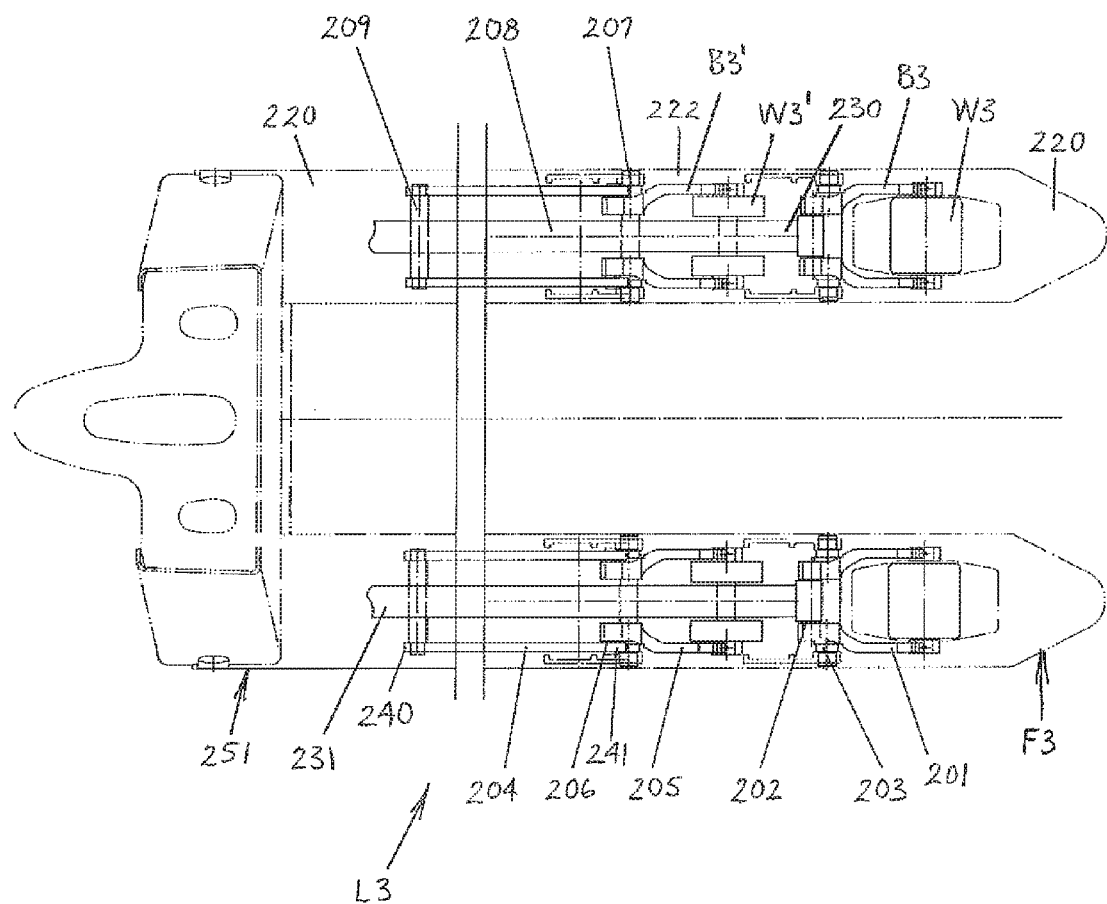
FIG. 9 is a schematic bottom view of the third example pallet truck load wheel system of FIG. 8.
Figure 10:
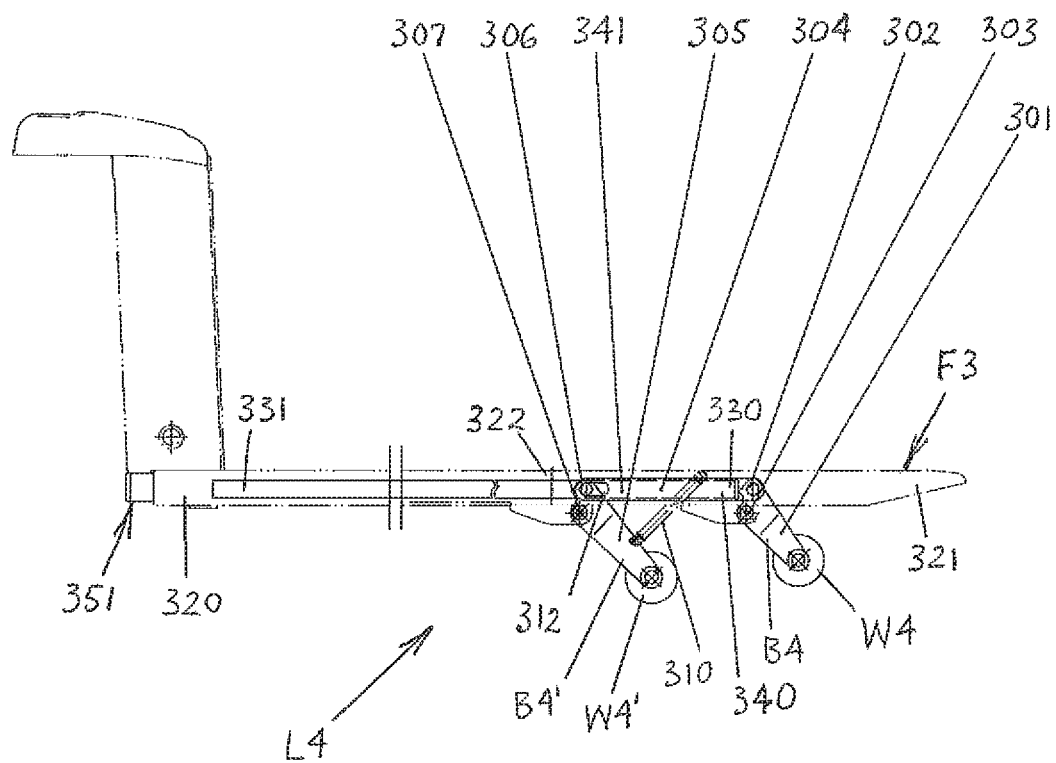
FIG. 10 is a schematic side view of a fourth example pallet truck load wheel system for a pallet truck having a selective turning radius, with other structures removed for ease of viewing.
Figure 11:
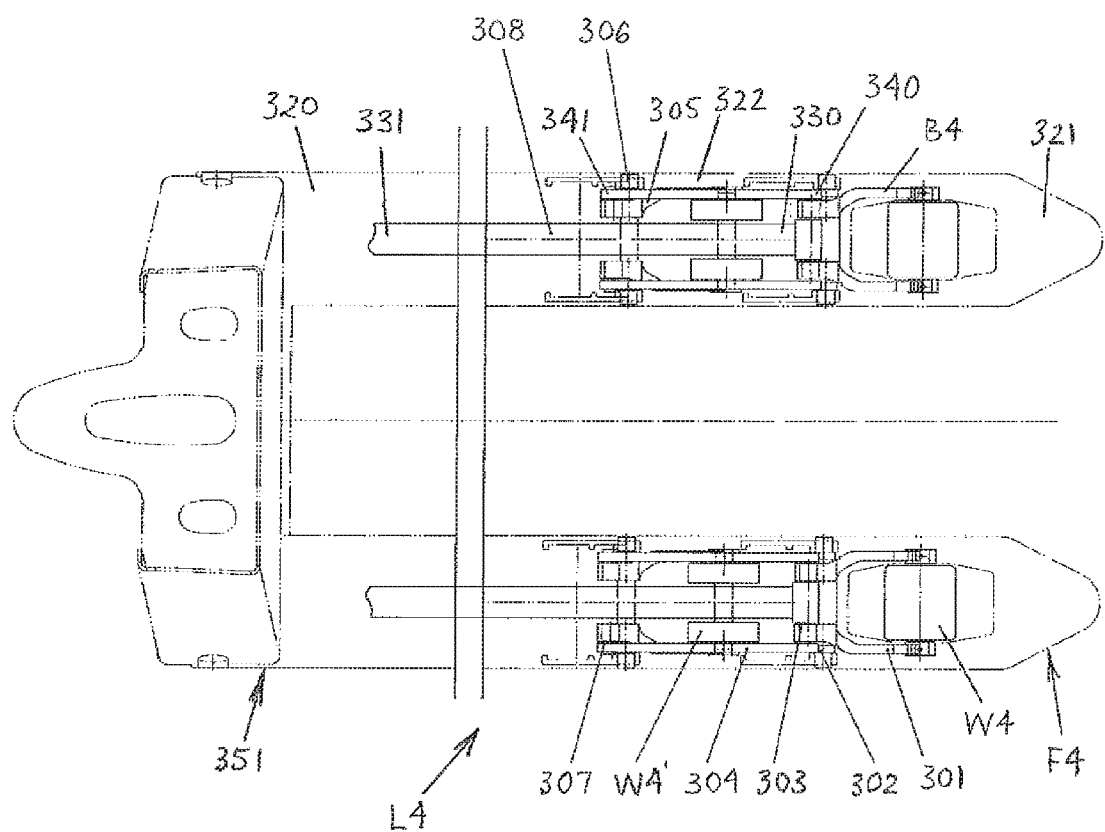
FIG. 11 is a schematic bottom view of the third example pallet truck load wheel system of FIG. 10.
Figure 12:
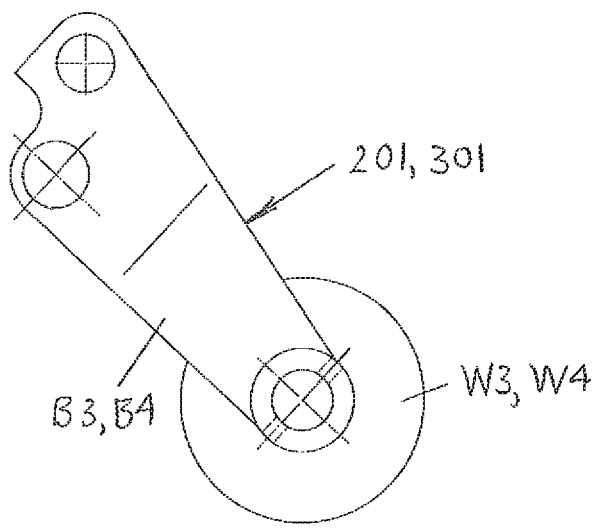
FIG. 12 is a schematic side view of a forward load wheel assembly of the third and fourth example pallet truck load wheel systems of FIGS. 8 and 10.
Figure 13:
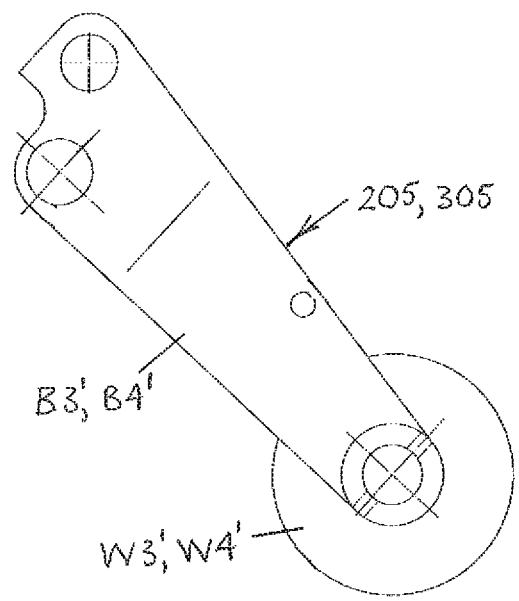
FIG. 13 is a schematic side view of a central load wheel assembly of the third and fourth example pallet truck load wheel systems of FIGS. 8 and 10.

The load wheel system L2 also includes a second activation arm 104 having a first end 140 and an opposed second end 141. The second activation arm 104 is coupled to the first activation arm 108 at the first end 140 by a pivotal connection at the pin or shaft 102, and has a slot 112 at the second end 141. The slot 112 at the second end 141 of the second activation arm 104 is slidably and pivotally coupled to the central load wheel assembly 105 at a pin or shaft 106 located at an intermediate position along the bracket B2', which is spaced from and below the pivotal connection of the central load wheel assembly 105 to the fork F2 at the pin or shaft 107. The rearward end 131 of the first activation arm 108 is pivotally connected to a crank link C2 at a pin or shaft 114. The crank link C2 has a pivotal connection to a load lift portion 151 of a pallet truck. The pivotal connection of the crank link C2 to the load lift portion 151 is at a pin or shaft 116, and the rear of the crank link C2 has a further pivotal connection to a base support portion of the pallet truck at a pin or shaft 118. In FIG. 3, as the load lift portion 151 is raised by a lift cylinder relative to the base support portion of the pallet truck, the crank link C2 rotates clockwise and pulls the first activation arm 108 to cause lifting of the fork F2.

An operator of the pallet truck may cause movement of the crank link C2, such as by pushing a button or otherwise providing an input to a controller, so as to select actuation of a lift cylinder to lift or lower the rear of the load lift portion 151 relative to a rear base support portion having a rear wheel that is directionally adjustable. Operation of the lift cylinder within a first preselected upward and downward range limits rotation of the crank link C2, which will move the first activation arm 108 and force the forward load wheel assembly 101 to pivot and correspondingly raise or lower the fork F2. When lowering the lift cylinder, the crank link C2 pushes the first activation arm 108 forward, forcing the forward wheel assembly 101 to pivot forward and upward toward the fork F2, thereby lowering the fork F2 toward the ground surface. When the lift cylinder is raised, the crank link C2 moves the first activation arm 108 rearward, which pivots the forward wheel assembly 101 rearward and downward, thereby lifting and supporting the fork F2 above the ground surface.

A biasing element 110, such as a spring, is connected to and biases the central load wheel assembly 105 upward toward the fork F2, to a return or raised position. The biasing element 110 has a first end connected to the central load wheel assembly 105 and a second end connected to the fork F2. When supported by the forward load wheel assembly 101, the pallet truck has a turning radius that is dependent upon the distance between the directionally adjustable rear wheel of the pallet truck and a wheel W2 of the forward load wheel assembly 101, which will provide the pivot about which the pallet truck turns.

In this second example, the first end 140 of the second activation arm 104 has a pivotal connection coupled to the first activation arm 108 at the pin or shaft 102, which is at a position spaced forward of the pivotal connection of the central load wheel assembly 105 to the fork F2 at the pin or shaft 107. The second activation arm 104 moves with the first activation arm 108 at the pin or shaft 102. The operator is able to selectively cause further rotation of the crank link C2, such as by pushing a button or otherwise providing an input to a controller, so as to select further actuation of the lift cylinder to cause a higher lift position, which causes the crank link C2 to rotate further, in turn forcing the first activation arm 108 to exceed the regular lifting stroke necessary to pivot the forward load wheel assembly 101 rearward and downward to lift the fork F2. When this happens, the second activation arm 104 is pulled further rearward until the pin or shaft 106 on the central load wheel assembly 105 has moved within the slot 112 at the second end 141 and causes the second activation arm 104 to effectively further pull and pivot the central load wheel assembly 105 rearward and downward, so that both the central load wheel assembly 105 and the forward load wheel assembly 101 at least momentarily engage the ground surface and support the fork F2. The biasing element 110 is stretched as this pivoting of the central load wheel assembly 105 occurs. As the first activation arm 108 continues to move further rearward, the second activation arm 104 is moved until the central load wheel assembly 105 has pivoted to a position in which the central load wheel assembly 105 supports the fork F2 on the ground surface, the biasing element 110 is stretched, and the forward load wheel assembly 101 hangs from the fork F2, because it has a shorter effective length than the central load wheel assembly 105.

Thus, with pulling movement of the first activation arm 108, the second activation arm 104 may be used to effectively further pull and pivot the central load wheel assembly 105 rearward and downward to deploy the central load wheel assembly 105 as the biasing element 110 is stretched. Indeed, the first activation arm 108 is movable to pivot the central load wheel assembly 105 to at least momentarily support the fork F2 on both the forward load wheel assembly 101 and the central load wheel assembly 105. The first activation arm 108 is further movable to pivot the central load wheel assembly 105 to lift and support the fork F2 on the central load wheel assembly 105. The central load wheel assembly 105 has a greater effective length than the forward load wheel assembly 101. The effective relative lengths and the pivot positions for the central load wheel assembly 105 and forward load wheel assembly 101 provide for greater vertical displacement of the fork F2 by the central load wheel assembly 105, once the first activation arm 108 causes the second activation arm 104 to force the central load wheel assembly 105 to pivot rearward and downward so as to engage the ground surface and lift the fork F2. This, in turn, will cause the forward load wheel assembly 101 to hang from the fork F2 and not engage the ground surface, thereby selectively resulting in a reduced turning radius as a wheel W2' of the central load wheel assembly 105 serves as the forward pivot about which the pallet truck turns. The shorter distance between the directionally adjustable rear wheel and the wheel W2' of the central load wheel assembly 105, when compared to the distance between the directionally adjustable rear wheel and the wheel W2 of the forward load wheel assembly 101, provides a smaller turning radius and greater maneuverability of the pallet truck.

It will be appreciated that the disclosure provides a second example of a pallet truck having a selective turning radius in FIGS. 3-7, in conjunction with the components shown more fully with the other examples. The pallet truck includes a base support portion and load lift portion 151 connected to and extending forward of the base support portion, and a wheel rotatably connected to the base support portion and being directionally adjustable. The load lift portion 151 includes at least one fork F2 having a rearward end 120, a forward end 121 and a central portion 122 extending between the rearward end 120 and the forward end 121, and a load wheel system L2 connected to the at least one fork F2. The load wheel system L2 further includes a forward load wheel assembly 101 coupled by a pivotal connection at the pin or shaft 103 to the at least one fork F2 near the forward end 121 of the at least one fork F2, and a central load wheel assembly 105 coupled by a pivotal connection at the pin or shaft 107 to the at least one fork F2 near a center of the central portion 122 of the at least one fork F2. The load wheel system L2 also includes a first activation arm 108 extending forward and rearward of the central load wheel assembly 105 and being coupled by a pivotal connection at the pin or shaft 102 to the forward load wheel assembly 101 at a position spaced from the pivotal connection at the pivotal shaft 103 of the forward load wheel assembly 101 to the at least one fork F2, a second activation arm 104 being coupled by a pivotal connection at the pin or shaft 102 coupled to the first activation arm 108 at a first end 140 and a slot 112 at a second end 141, and the slot 112 at the second end 141 of the second activation arm 104 being slidably and pivotally coupled to the central load wheel assembly 105 at the pin or shaft 106 spaced from the pivotal connection at the pin or shaft 107 of the central load wheel assembly 105 to the at least one fork F2.

In this second example, the first activation arm 108 is movable to pivot the forward load wheel assembly 101 to lift and support the at least one fork F2 on the forward load wheel assembly 101. It will be appreciated that when the at least one fork F2 is lifted and supported by the forward load wheel assembly 101, the pallet truck has a first turning radius relating to the distance between the wheel rotatably connected to the base support portion and the forward load wheel assembly 101. The first activation arm 108 is further movable to pivot the central load wheel assembly 105 to support the at least one fork F2 on both the forward load wheel assembly 101 and the central load wheel assembly 105. In addition, the first activation arm 108 is further movable to pivot the central load wheel assembly 105 to lift and support the at least one fork F2 on the central load wheel assembly 105. It further will be appreciated that when the at least one fork F2 is lifted and supported by the central load wheel assembly 105, the pallet truck has a second turning radius relating to the distance between the wheel rotatably connected to the base support portion and the central load wheel assembly 105. When the at least one fork F2 is lifted and supported by the central load wheel assembly 105, the forward load wheel assembly 101 hangs from the at least one fork F2. Also, to keep the central load wheel assembly 105 conveniently tucked out of the way when not in use, a biasing element 110 is configured to bias the central load wheel assembly 105 toward a raised position. In this second example, the biasing element 110 has a first end connected to the central load wheel assembly 105 and a second end connected to the at least one fork F2, although it will be appreciated that other configurations for a biasing element may be utilized. Alternatively, the load wheel system L2 could utilize a different mechanism to move the central load wheel assembly 105 to a raised position when it is not supporting the fork F2.

A third example pallet truck load wheel system L3 is shown in FIGS. 7-9 and 12-15. The load wheel system L3 may be used in a pallet truck P3 to provide a selective turning radius. Thus, the pallet truck P3 may be configured to have two or more turning radii from which to select, depending on which would be more convenient in a given environment. The third example load wheel system L3 is shown in a configuration that happens to provide a first turning radius that would be similar to that of a typical pallet truck, but also provides for selective use of a second significantly reduced turning radius.

Similarly to the first example, the third example pallet truck load wheel system L3 is shown in various views relative to portions of a pallet truck P3, and it will be understood upon review of this entire disclosure that the remainder of the pallet truck P3 may be represented by other components that would be in common with the pallet truck P4 shown in FIGS. 16-20. The third example pallet truck load wheel system L3 is for use with a fork F3 of a pallet truck P3, where the fork F3 has a rearward end 220, a forward end 221 and a central portion 222 extending between the rearward end 220 and the forward end 221. The load wheel system L3 includes a forward load wheel assembly 201 having a bracket B3 and one or more load wheels W3 rotatably connected to the bracket B3 at a first end. The forward load wheel assembly 201 is coupled to the fork F3 by a pivotal connection to the fork F3 near the forward end 221 of the fork F3 and at a mounting position below the body of the fork F3. The coupling is by a pivotal connection of the forward load wheel assembly 201 to the fork F3 at a pin or shaft 203 at an intermediate position along the bracket B3.

The load wheel system L3 also has a central load wheel assembly 205 having a bracket B3' and one or more load wheels W3' rotatably connected to the bracket B3' at a first end. The central load wheel assembly 205 is coupled to the fork F3 by a pivotal connection to the fork F3 near a center of the central portion 222 of the fork F3 and at a mounting position below the body of the fork F3. The coupling is by a pivotal connection of the central load wheel assembly 205 to the fork F3 at a pin or shaft 207 at an intermediate position along the bracket B3'.

The load wheel system L3 further includes a first activation arm 208 extending forward and rearward of the central load wheel assembly 205 and having a forward end 230 and a rearward end 231. The first activation arm 208 is coupled to the forward load wheel assembly 201 via a pivotal connection to the forward load wheel assembly 201 at a forward end 230 of the first activation arm 208 at a pin or shaft 202 located at the second end of the bracket B3, which is spaced from the pivotal connection of the forward load wheel assembly 201 to the fork F3 at the pin or shaft 203.

The load wheel system L3 also includes a second activation arm 204 having a first end 240 and an opposed second end 241. The second activation arm 204 has a pivotal connection coupled to the first activation arm 208 at the first end 240 at the pin or shaft 209, and has a slot 212 at the second end 241. The slot 212 at the second end 241 of the second activation arm 204 is slidably and pivotally coupled to the central load wheel assembly 205 at a pin or shaft 206 located at the second end of the bracket B3', which is spaced from and above the pivotal connection of the central load wheel assembly 205 to the fork F3 at the pin or shaft 207. The rearward end 231 of the first activation arm 208 is pivotally connected to a crank link C3 at a pin or shaft 214. The crank link C3 has a pivotal connection to a load lift portion 251 of a pallet truck. The pivotal connection of the crank link C3 to the load lift portion 251 is at a pin or shaft 216, and the rear of the crank link C3 has a further pivotal connection to a base support portion of the pallet truck at a pin or shaft 218. As the load lift portion 251 is raised by a lift cylinder relative to the base support portion of the pallet truck, the crank link C3 rotates and pushes the first activation arm 208 to cause lifting of the fork F3.

An operator of the pallet truck P3 may cause movement of the crank link C3, such as by pushing a button or otherwise providing an input to a controller, so as to select actuation of a lift cylinder to lift or lower the rear of the load lift portion 251 relative to a rear base support portion having a rear wheel that is directionally adjustable. Operation of the lift cylinder within a first preselected upward and downward range limits rotation of the crank link C3, which will move the first activation arm 208 and force the forward load wheel assembly 201 to pivot and correspondingly raise or lower the fork F3. When lowering the lift cylinder, the crank link C3 pulls the first activation arm 208 rearward, forcing the forward wheel assembly 201 to pivot forward and upward toward the fork F3, thereby lowering the fork F3 toward the ground surface. When the lift cylinder is raised, the crank link C3 moves the first activation arm 208 forward, which pivots the forward wheel assembly 201 rearward and downward, thereby lifting and supporting the fork F3 above the ground surface.

A biasing element 210, such as a spring, is connected to and biases the central load wheel assembly 205 upward toward the fork F3, to a return or raised position. The biasing element 210 has a first end connected to the central load wheel assembly 205 and a second end connected to the fork F3. When supported by the forward load wheel assembly 201, the pallet truck P3 has a turning radius that is dependent upon the distance between the directionally adjustable rear wheel R3 of the pallet truck P3 and a wheel W3 of the forward load wheel assembly 201, which will provide the pivot about which the pallet truck P3 turns.

In this third example, the first end 240 of the second activation arm 204 has a pivotal connection coupled to the first activation arm 208 at the pin or shaft 209, which is at a position spaced rearward of the pivotal connection of the central load wheel assembly 205 to the fork F3 at the pin or shaft 207. The second activation arm 204 moves with the first activation arm 208 at the pin or shaft 209. The operator is able to selectively cause further rotation of the crank link C3, such as by pushing a button or otherwise providing an input to a controller, so as to select further actuation of the lift cylinder to cause a higher lift position, which causes the crank link C3 to rotate further, in turn forcing the first activation arm 208 to exceed the regular lifting stroke necessary to pivot the forward load wheel assembly 201 rearward and downward to lift the fork F3. When this happens, the second activation arm 204 is pushed further forward until the pin or shaft 206 on the central load wheel assembly 205 has moved within the slot 212 at the second end 241 and causes the second activation arm 204 to pivot the central load wheel assembly 205 rearward and downward, so that both the central load wheel assembly 205 and the forward load wheel assembly 201 at least momentarily engage the ground surface and support the fork F3. The biasing element 210 is stretched as this pivoting of the central load wheel assembly 205 occurs. As the first activation arm 208 continues to move further forward, the second activation arm 204 is moved until the central load wheel assembly 205 has pivoted to a position in which the central load wheel assembly 205 supports the fork F3 on the ground surface, the biasing element 210 is stretched, and the forward load wheel assembly 201 hangs from the fork F3, because it has a shorter effective length than the central load wheel assembly 205.

Thus, with pushing movement of the first activation arm 208, the second activation arm 204 may be used to push and pivot the central load wheel assembly 205 rearward and downward to deploy the central load wheel assembly 205 as the biasing element 210 is stretched. Indeed, the first activation arm 208 is movable to pivot the central load wheel assembly 205 to at least momentarily support the fork F3 on both the forward load wheel assembly 201 and the central load wheel assembly 205. The first activation arm 208 is further movable to pivot the central load wheel assembly 205 to lift and support the fork F3 on the central load wheel assembly 205. The central load wheel assembly 205 has a greater effective length than the forward load wheel assembly 201. The effective relative lengths and the pivot positions for the central load wheel assembly 205 and forward load wheel assembly 201 provide for greater vertical displacement of the fork F3 by the central load wheel assembly 205, once the first activation arm 208 causes the second activation arm 204 to force the central load wheel assembly 205 to pivot rearward and downward so as to engage the ground surface and lift the fork F3. This, in turn, will cause the forward load wheel assembly 201 to hang from the fork F3 and not engage the ground surface, thereby selectively resulting in a reduced turning radius as a wheel W3' of the central load wheel assembly 205 serves as the forward pivot about which the pallet truck P3 turns. The shorter distance between the directionally adjustable rear wheel R3 and the wheel W3' of the central load wheel assembly 205, when compared to the distance between the directionally adjustable rear wheel R3 and the wheel W3 of the forward load wheel assembly 201, provides a smaller turning radius and greater maneuverability of the pallet truck P3.

It will be appreciated that the disclosure provides a third example of a pallet truck P3 having a selective turning radius in FIGS. 7-9 and 12-15, in conjunction with the components shown more fully with the other examples. The pallet truck P3 includes a base support portion 250 and load lift portion 251 connected to and extending forward of the base support portion 250, and a wheel R3 rotatably connected to the base support portion 250 and being directionally adjustable. FIGS. 14 and 15 show that a handle 252 that is rotatably connected to the base support portion 250 may be rotated left to right to steer the directionally adjustable wheel R3 by moving the handle 252 to a desired steering position, such as may be shown among the three example positions identified in FIGS. 14 and 15. The load lift portion 251 includes at least one fork F3 having a rearward end 220, a forward end 221 and a central portion 222 extending between the rearward end 220 and the forward end 221, and a load wheel system L3 connected to the least one fork F3. The load wheel system L3 further includes a forward load wheel assembly 201 coupled by a pivotal connection at the pin or shaft 203 to the at least one fork F3 near the forward end 221 of the at least one fork F3, and a central load wheel assembly 205 coupled by a pivotal connection at the pin or shaft 207 to the at least one fork F3 near a center of the central portion 222 of the at least one fork F3. The load wheel system L3 also includes a first activation arm 208 extending forward and rearward of the central load wheel assembly 205 and being coupled by a pivotal connection at the pin or shaft 202 to the forward load wheel assembly 201 at a position spaced from the pivotal connection at the pin or shaft 203 of the forward load wheel assembly 201 to the at least one fork F3, a second activation arm 204 being coupled a pivotal connection at the pin or shaft 209 to the first activation arm 208 at a first end 240 and a slot 212 at a second end 241, and the slot 212 at the second end 241 of the second activation arm 204 being slidably and pivotally coupled to the central load wheel assembly 205 at the pin or shaft 206 spaced from the pivotal connection at the pin or shaft 207 of the central load wheel assembly 205 to the at least one fork F3.

In this third example, the first activation arm 208 is movable to pivot the forward load wheel assembly 201 to lift and support the at least one fork F3 on the forward load wheel assembly 201. It will be appreciated that when the at least one fork F3 is lifted and supported by the forward load wheel assembly 201, the pallet truck P3 has a first turning radius relating to the distance between the wheel R3 rotatably connected to the base support portion 250 and the forward load wheel assembly 201. The first activation arm 208 is further movable to pivot the central load wheel assembly 205 to support the at least one fork F3 on both the forward load wheel assembly 201 and the central load wheel assembly 205. In addition, the first activation arm 208 is further movable to pivot the central load wheel assembly 205 to lift and support the at least one fork F3 on the central load wheel assembly 205. It further will be appreciated that when the at least one fork F3 is lifted and supported by the central load wheel assembly 205, the pallet truck P3 has a second turning radius relating to the distance between the wheel R3 rotatably connected to the base support portion 250 and the central load wheel assembly 205. When the at least one fork F3 is lifted and supported by the central load wheel assembly 205, the forward load wheel assembly 201 hangs from the at least one fork F3. Also, to keep the central load wheel assembly 205 conveniently tucked out of the way when not in use, a biasing element 210 is configured to bias the central load wheel assembly 205 toward a raised position. In this third example, the biasing element 210 has a first end connected to the central load wheel assembly 205 and a second end connected to the at least one fork F3, although it will be appreciated that other configurations for a biasing element may be utilized. Alternatively, the load wheel system L3 may utilize a different mechanism to move the central load wheel assembly 205 to a raised position when it is not supporting the fork F3.

Figure 17:
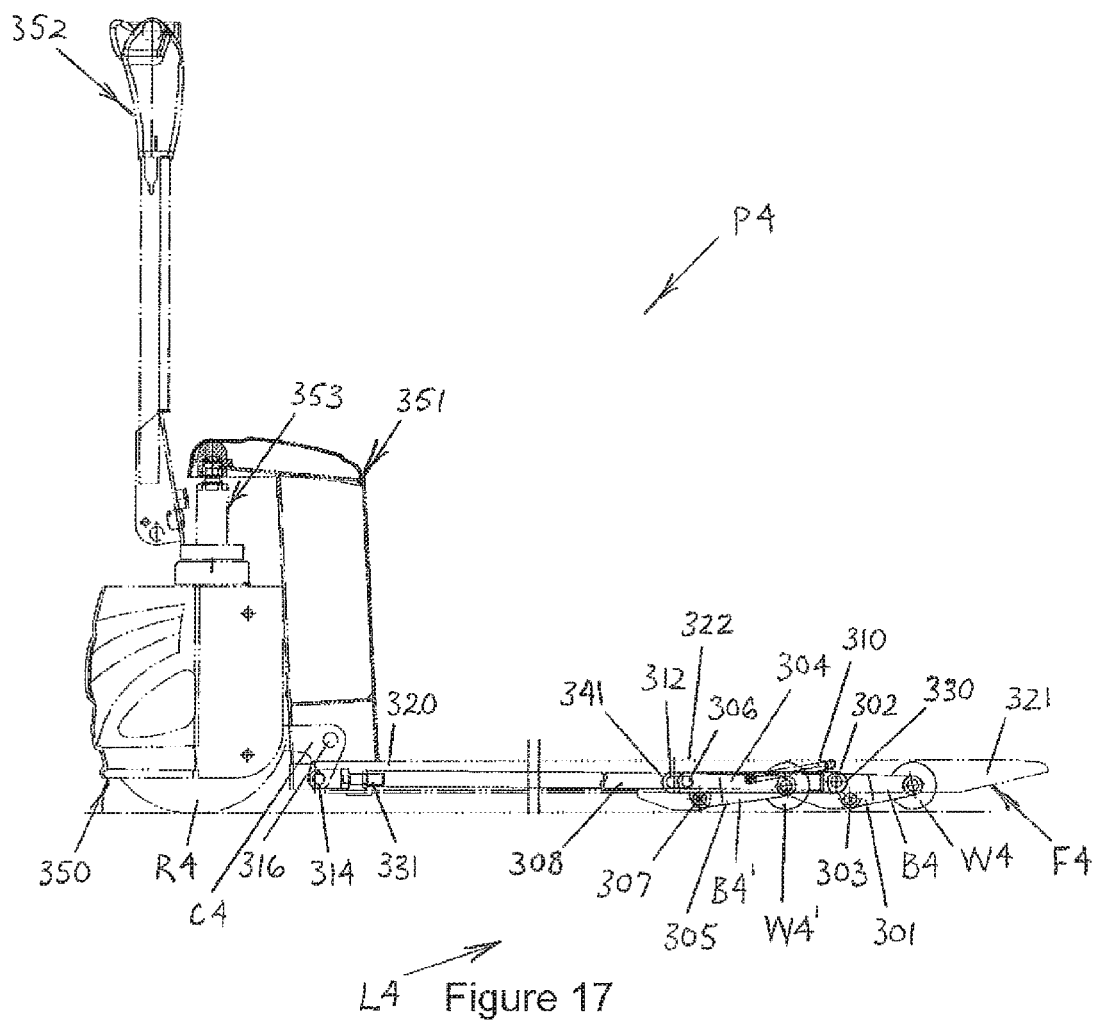
FIG. 17 is a schematic side view of the pallet truck of FIG. 10, having the forks in a fully lowered position.
Figure 18:
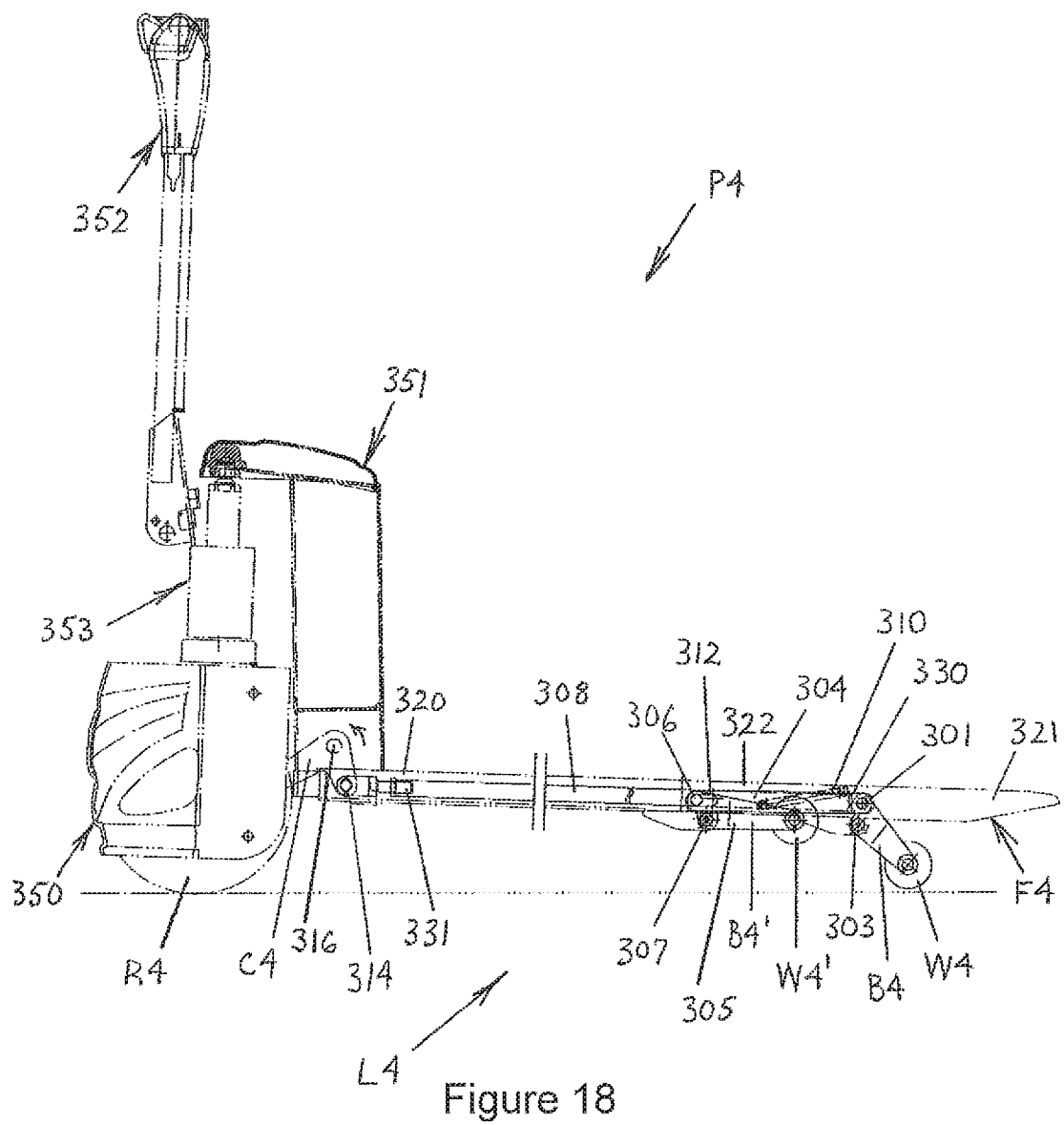
FIG. 18 is a schematic side view of the pallet truck of FIG. 10, having the forks in a raised position with each fork supported by the forward load wheel assembly engaging the ground surface.
Figure 19:
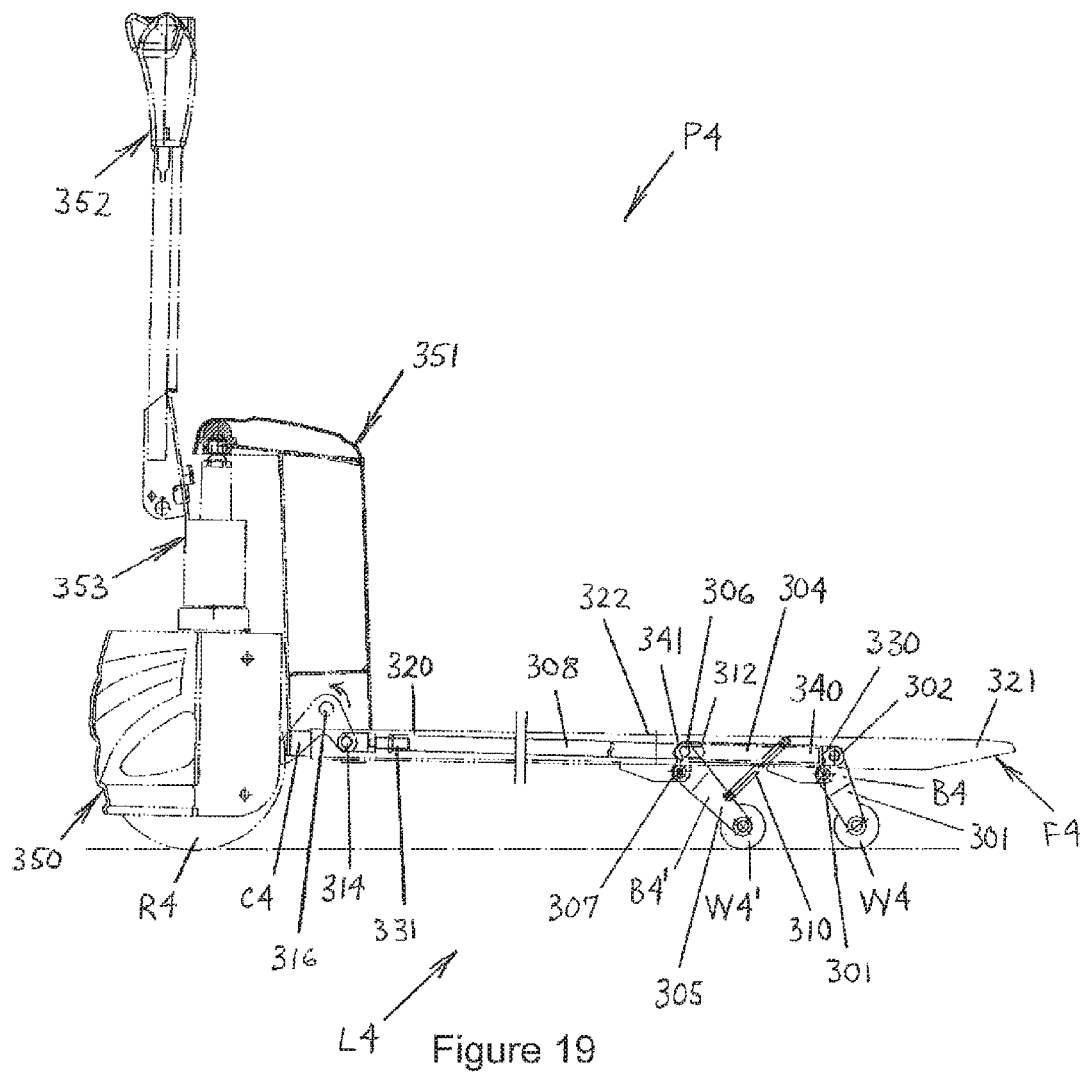
FIG. 19 is a schematic side view of the pallet truck of FIG. 10, having the forks in a raised position with each fork supported by both the forward load wheel assembly and the central load wheel assembly engaging the ground surface.
Figure 20:
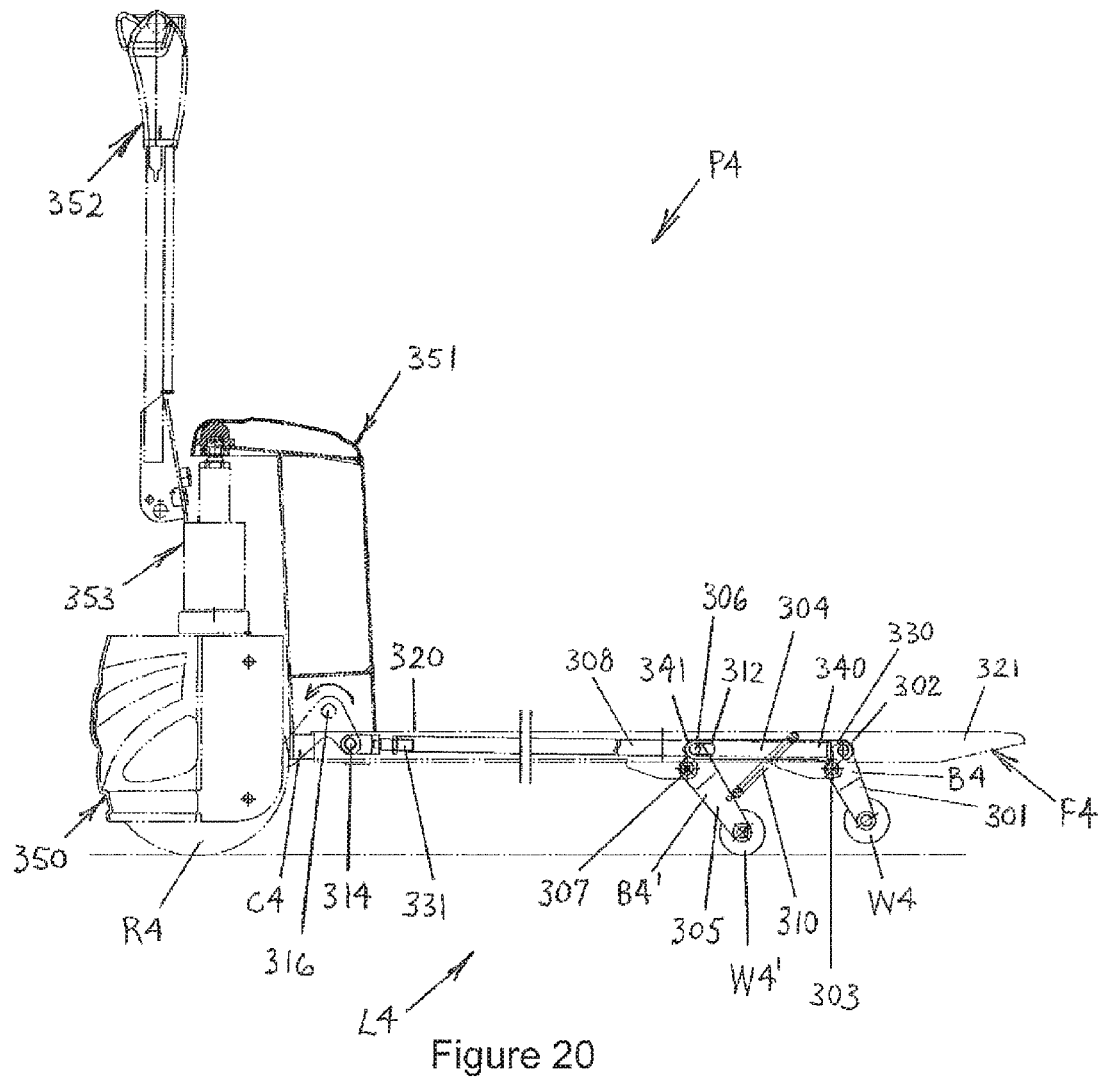
FIG. 20 is a schematic side view of the pallet truck of FIG. 10, having the forks in a raised position with each fork supported by the central load wheel assembly engaging the ground surface.

A fourth example pallet truck load wheel system L4 is shown in FIGS. 7, 10-13 and 16, with additional FIGS. 17-20 of a pallet truck P4 showing the fourth example in a series of four progressive positions, ranging from a fork being in a lowered position in FIG. 17, to the fork being supported by a forward load wheel assembly in FIG. 18, to a time at which support of the fork is being transitioned from the forward load wheel assembly to a central load wheel assembly in FIG. 19, to the fork being supported by the central load wheel assembly in FIG. 20. As demonstrated in FIGS. 17-20, the load wheel system L4 may be used in a pallet truck P4 to provide a selective turning radius. Thus, the pallet truck P4 may be configured to have two or more turning radii from which to select, depending on which would be more convenient in a given environment. The fourth example load wheel system L4 is shown in a configuration that happens to provide a first turning radius that would be similar to that of a typical pallet truck, but also provides for selective use of a second significantly reduced turning radius. It will be appreciated that the aforementioned first, second and third example load wheel systems for pallet trucks having a selective turning radius would provide similar progressive lowered and raised positions of the pallet truck forks.

The fourth example pallet truck load wheel system L4 is shown in various views relative to portions of a pallet truck P4, and it will be understood upon review of this entire disclosure that many of the additional components of a pallet truck that are shown for the fourth example pallet truck P4 would be common to the other pallet trucks disclosed herein, but much of such additional subject matter was not included in all of the drawings, so as to better show particular portions of the structures. The fourth example pallet truck load wheel system L4 is for use with a fork F4 of a pallet truck P4, where the fork F4 has a rearward end 320, a forward end 321 and a central portion 322 extending between the rearward end 320 and the forward end 321. The load wheel system L4 includes a forward load wheel assembly 301 having a bracket B4 and one or more load wheels W4 rotatably connected to the bracket B4 at a first end. The forward load wheel assembly 301 is coupled to the fork F4 by a pivotal connection to the fork F4 near the forward end 321 of the fork F4 and at a mounting position below the body of the fork F4. The coupling is by a pivotal connection of the forward load wheel assembly 301 to the fork F4 at a pin or shaft 303 at an intermediate position along the bracket B4.

The load wheel system L4 also has a central load wheel assembly 305 having a bracket B4' and one or more load wheels W4' rotatably connected to the bracket B4' at a first end. The central load wheel assembly 305 is coupled to the fork F4 by a pivotal connection to the fork F4 near a center of the central portion 322 of the fork F4 and at a mounting position below the body of the fork F4. The coupling is by a pivotal connection of the central load wheel assembly 305 to the fork F4 at a pin or shaft 307 at an intermediate position along the bracket B4'.

The load wheel system L4 further includes a first activation arm 308 extending forward and rearward of the central load wheel assembly 305 and having a forward end 330 and a rearward end 331. The first activation arm 308 is coupled to the forward load wheel assembly via a pivotal connection to the forward load wheel assembly 301 at a forward end 330 of the first activation arm 308 at a pin or shaft 302 located at the second end of the bracket B4, which is spaced from the pivotal connection of the forward load wheel assembly 301 to the fork F4 at the pin or shaft 303.

The load wheel system L4 also includes a second activation arm 304 having a first end 340 and an opposed second end 341. The second activation arm 304 is coupled to the first activation arm 308 at the first end 340 by a pivotal connection at the pin or shaft 302, and has a slot 312 at the second end 341. The slot 312 at the second end 341 of the second activation arm 304 is slidably and pivotally coupled to the central load wheel assembly 305 at a pin or shaft 306 located at the second end of the bracket B4', which is spaced from and above the pivotal connection of the central load wheel assembly 305 to the fork F4 at the pin or shaft 306.

The rearward end 331 of the first activation arm 308 is pivotally connected to a crank link C4 at a pin or shaft 314. The crank link C4 has a pivotal connection to a load lift portion 351 of the pallet truck P4. The pivotal connection of the crank link C4 to the load lift portion 351 is at a pin or shaft 316, and the rear of the crank link C4 has a further pivotal connection to a base support portion 350 of the pallet truck P4 at a pin or shaft. As the load lift portion 351 is raised by a lift cylinder 353 relative to the base support portion 350 of the pallet truck P4, the crank link C4 rotates and pushes the first activation arm 308 to cause lifting of the fork F4.

An operator of the pallet truck P4 may cause movement of the crank link C4, such as by pushing a button or otherwise providing an input to a controller, so as to select actuation of a lift cylinder 353 to lift or lower the rear of the load lift portion 351 relative to a rear base support portion 350 having a rear wheel R4 that is directionally adjustable. Operation of the lift cylinder 353 within a first preselected upward and downward range limits rotation of the crank link C4, which will move the first activation arm 308 and force the forward load wheel assembly 301 to pivot and correspondingly raise or lower the fork F4. When lowering the lift cylinder 353, the crank link C4 pulls the first activation arm 308 rearward, forcing the forward wheel assembly 301 to pivot forward and upward toward the fork F4, thereby lowering the fork F4 toward the ground surface, until a lowered fork position is reached, as shown in FIG. 17. When the lift cylinder 353 is raised, the crank link C4 moves the first activation arm 308 forward, which pivots the forward load wheel assembly 301 rearward and downward, thereby lifting and supporting the fork F4 above the ground surface, as shown in FIG. 18.

A biasing element 310, such as a spring, is connected to and biases the central load wheel assembly 305 upward toward the fork F4, to a return or raised position. The biasing element 310 has a first end connected to the central load wheel assembly 305 and a second end connected to the fork F4. When supported by the forward load wheel assembly 301, the pallet truck P4 has a turning radius that is dependent upon the distance between the directionally adjustable rear wheel R4 of the pallet truck P4 and a wheel W4 of the forward load wheel assembly 301, which will provide the pivot about which the pallet truck P4 turns.

In this fourth example, the front end 340 of the second activation arm 304 has a pivotal connection coupled to the first activation arm 308 at the pin or shaft 302, which is at a position spaced above the pivotal connection of the central load wheel assembly 305 to the fork F4 at the pin or shaft 303. The second activation arm 304 moves with the first activation arm 308 at the pin or shaft 302. The operator is able to selectively cause further rotation of the crank link C4, such as by pushing a button or otherwise providing an input to a controller, so as to select further actuation of the lift cylinder 353 to cause a higher lift position, which causes the crank link C4 to rotate further, in turn forcing the first activation arm 308 to exceed the regular lifting stroke necessary to pivot the forward load wheel assembly 301 rearward and downward to lift the fork F4. When this happens, the second activation arm 304 is pushed further forward until the pin or shaft 306 on the central load wheel assembly 305 has moved within the slot 312 at the second end 341 and causes the second activation arm 304 to push and pivot the central load wheel assembly 305 rearward and downward, so that both the central load wheel assembly 305 and the forward load wheel assembly 301 at least momentarily engage the ground surface and support the fork F4, as shown in FIG. 19. The biasing element 310 is stretched as this pivoting of the central load wheel assembly 305 occurs. As shown in FIG. 20, as the first activation arm 308 continues to move further forward, the second activation arm 304 is moved until the central load wheel assembly 305 has pivoted to a position in which the central load wheel assembly 305 supports the fork F4 on the ground surface, the biasing element 310 is stretched, and the forward load wheel assembly 301 hangs from the fork F4, because it has a shorter effective length than the central load wheel assembly 305.

Thus, with pushing movement of the first activation arm 308, the second activation arm 304 may be used to push and pivot the central load wheel assembly 305 rearward and downward to deploy the central load wheel assembly 305 as the biasing element 310 is stretched. Indeed, the first activation arm 308 is movable to pivot the central load wheel assembly 305 to at least momentarily support the fork F4 on both the forward load wheel assembly 301 and the central load wheel assembly 305. The first activation arm 308 is further movable to pivot the central load wheel assembly 305 to lift and support the fork F4 on the central load wheel assembly 305. The central load wheel assembly 305 has a greater effective length than the forward load wheel assembly 301. The effective relative lengths and the pivot positions for the central load wheel assembly 305 and forward load wheel assembly 301 provide for greater vertical displacement of the fork F4 by the central load wheel assembly 305, once the first activation arm 308 causes the second activation arm 304 to force the central load wheel assembly 305 to pivot rearward and downward so as to engage the ground surface and lift the fork F4. This, in turn, will cause the forward load wheel assembly 301 to hang from the fork F4 and not engage the ground surface, thereby selectively resulting in a reduced turning radius as a wheel W4' of the central load wheel assembly 305 serves as the forward pivot about which the pallet truck P3 turns. The shorter distance between the directionally adjustable rear wheel R4 and the wheel W4' of the central load wheel assembly 305, when compared to the distance between the directionally adjustable rear wheel R4 and the wheel W4 of the forward load wheel assembly 301, provides a shorter turning radius and greater maneuverability of the pallet truck P4.

It will be appreciated that the disclosure provides a fourth example of a pallet truck P4 having a selective turning radius in FIGS. 7, 10-13 and 16-20, in conjunction with the components shown in the other examples. The pallet truck P4 includes a base support portion 350 and load lift portion 351 connected to and extending forward of the base support portion 350, and a wheel R4 rotatably connected to the base support portion 350 and being directionally adjustable. FIGS. 16-20 show a handle 352 that is similar to the handle 252 of the pallet truck P3 in that it is rotatably connected to the base support portion 350 and may be rotated left to right to steer the directionally adjustable wheel R4 by moving the handle 352 to a desired steering position. The load lift portion 351 includes at least one fork F4 having a rearward end 320, a forward end 321 and a central portion 322 extending between the rearward end 320 and the forward end 321, and a load wheel system L4 connected to the at least one fork F4. The load wheel system L4 further includes a forward load wheel assembly 301 coupled by a pivotal connection at the pin or shaft 303 to the at least one fork F4 near the forward end 321 of the at least one fork F4, and a central load wheel assembly 305 coupled by a pivotal connection at the pin or shaft 307 to the at least one fork F4 near a center of the central portion 322 of the at least one fork F4. The load wheel system L4 also includes a first activation arm 308 extending forward and rearward of the central load wheel assembly 305 and being coupled by a pivotal connection at the pin or shaft 302 to the forward load wheel assembly 301 at a position spaced from the pivotal connection 303 of the forward load wheel assembly 301 to the at least one fork F4, a second activation arm 304 being coupled by a pivotal connection at the pin or shaft 302 to the first activation arm 308 at a first end 340 and a slot 312 at a second end 341, and the slot 312 at the second end 341 of the second activation arm 304 being slidably and pivotally coupled to the central load wheel assembly 305 at the pin or shaft 306 spaced from the pivotal connection at the pin or shaft 307 of the central load wheel assembly 305 to the at least one fork F4.

In this fourth example, the first activation arm 308 is movable to pivot the forward load wheel assembly 301 to lift and support the at least one fork F4 on the forward load wheel assembly 301. It will be appreciated that when the at least one fork F4 is lifted and supported by the forward load wheel assembly 301, the pallet truck P4 has a first turning radius relating to the distance between the wheel R4 rotatably connected to the base support portion 350 and the forward load wheel assembly 301. The first activation arm 308 is further movable to pivot the central load wheel assembly 305 to support the at least one fork F4 on both the forward load wheel assembly 301 and the central load wheel assembly 305. In addition, the first activation arm 308 is further movable to pivot the central load wheel assembly 305 to lift and support the at least one fork F4 on the central load wheel assembly 305. It further will be appreciated that when the at least one fork F4 is lifted and supported by the central load wheel assembly 305, the pallet truck P4 has a second turning radius relating to the distance between the wheel R4 rotatably connected to the base support portion 350 and the central load wheel assembly 305. When the at least one fork F4 is lifted and supported by the central load wheel assembly 305, the forward load wheel assembly 301 hangs from the at least one fork F4. Also, to keep the central load wheel assembly 305 conveniently tucked out of the way when not in use, a biasing element 310 is configured to bias the central load wheel assembly 305 toward a raised position. In this fourth example, the biasing element 310 has a first end connected to the central load wheel assembly 305 and a second end connected to the at least one fork F4, although it will be appreciated that other configurations for a biasing element may be utilized. Alternatively, the load wheel system L4 may utilize a different mechanism to move the central load wheel assembly 305 to a raised position when it is not supporting the fork F4.

Based on the above described apparatus and methods, the disclosure presents highly advantageous solutions for problems encountered with typical pallet trucks that have a large turning radius. The load wheel systems provide a forward load wheel assembly and a central load wheel assembly that are pivotally connected to a fork of the pallet truck and that can be selectively deployed to lift and support the fork. A biasing element keeps the central load wheel assembly tucked upward and out of the way when it is not in use. A first activation arm moves the forward load wheel assembly and a second activation arm, and the second activation arm is used to move the central load wheel assembly. When the central load wheel assembly is selectively used to reduce the turning radius, the forward load wheel assembly is spaced above the ground surface and simply hangs from the fork. These solutions provide for increased convenience and productivity by allowing an operator to selectively reduce the turning radius of the pallet truck when desired. This also may permit more efficient utilization of the space required to operate the pallet truck.

It will be appreciated that the disclosed examples present numerous potential combinations of elements for carts and pallet trucks and methods of their use. Thus, while the present disclosure shows and demonstrates various example pallet truck load wheel systems that may be adapted for use in transporting pallets, these examples are merely illustrative and are not to be considered limiting. It will be apparent to those of ordinary skill in the art that various pallet trucks may be constructed and configured for use in moving goods, without departing from the scope or spirit of the present disclosure. For example, it will be appreciated that movement of the first activation arm may be provided in a variety of ways. Thus, while the examples herein utilize actuation of a lift cylinder that moves a load lift portion relative to a base support portion to also move the first activation arms to operate the load wheel assemblies for the forks, the movement of the first activation arms may be achieved by other means, such as by use of one or more separate actuators. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A pallet truck having a selective turning radius, the pallet truck comprising,
   a base support portion and load lift portion connected to and extending forward of the base support portion;
   a wheel rotatably connected to the base support portion and being directionally adjustable;
   the load lift portion including at least one fork having a rearward end, a forward end and a central portion extending between the rearward end and the forward end; and
   a load wheel system connected to the at least one fork and further comprising:
      a forward load wheel assembly having a pivotal connection to the at least one fork near the forward end of the at least one fork;
      a central load wheel assembly having a pivotal connection to the at least one fork near a center of the central portion of the at least one fork and having a biasing element configured to bias the central load wheel assembly toward a raised position;
      a first activation arm extending forward and rearward of the central load wheel assembly and having a pivotal connection to the forward load wheel assembly at a position spaced from the pivotal connection of the forward load wheel assembly to the at least one fork;
      a second activation arm having a pivotal connection coupled to the first activation arm at a first end and having a slot at a second end; and
      the slot at the second end of the second activation arm being slidably and pivotally coupled to the central load wheel assembly at a position spaced from the pivotal connection of the central load wheel assembly to the at least one fork.

2. The pallet truck of claim 1 wherein the first activation arm is movable to pivot the forward load wheel assembly to lift and support the at least one fork on the forward load wheel assembly, wherein the pallet truck has a first turning radius relating to the distance between the wheel rotatably connected to the base support portion and the forward load wheel assembly.

3. The pallet truck of claim 2 wherein the first activation arm is further movable to pivot the central load wheel assembly to support the at least one fork on both the forward load wheel assembly and the central load wheel assembly.

4. The pallet truck of claim 2 wherein the first activation arm is further movable to pivot the central load wheel assembly to lift and support the at least one fork on the central load wheel assembly, wherein the pallet truck has a second turning radius relating to the distance between the wheel rotatably connected to the base support portion and the central load wheel assembly.

5. The pallet truck of claim 4 wherein when the at least one fork is lifted and supported by the central load wheel assembly, the forward load wheel assembly hangs from the at least one fork.

6. The pallet truck of claim 1 wherein the biasing element has a first end connected to the central load wheel assembly and a second end connected to the at least one fork.

7. A pallet truck having a selective turning radius, the pallet truck comprising,
 a base support portion and load lift portion connected to and extending forward of the base support portion;
 a wheel rotatably connected to the base support portion and being directionally adjustable;
 the load lift portion including at least one fork having a rearward end, a forward end and a central portion extending between the rearward end and the forward end; and
 a load wheel system connected to the at least one fork and further comprising:
  a forward load wheel assembly having a pivotal connection to the at least one fork near the forward end of the at least one fork;
  a central load wheel assembly having a pivotal connection to the at least one fork near a center of the central portion of the at least one fork;
  a first activation arm having a fixed length and extending forward and rearward of the central load wheel assembly and having a pivotal connection to the forward load wheel assembly at a position spaced from the pivotal connection of the forward load wheel assembly to the at least one fork;
  a second activation arm having a fixed length and having a pivotal connection coupled to the first activation arm at a first end and having a slot at a second end; and
  the slot at the second end of the second activation arm being slidably and pivotally coupled to the central load wheel assembly at a position spaced from the pivotal connection of the central load wheel assembly to the at least one fork.

8. The pallet truck of claim 7 wherein the first activation arm is movable to pivot the forward load wheel assembly to lift and support the at least one fork on the forward load wheel assembly, wherein the pallet truck has a first turning radius relating to the distance between the wheel rotatably connected to the base support portion and the forward load wheel assembly.

9. The pallet truck of claim 8 wherein the first activation arm is further movable to pivot the central load wheel assembly to support the at least one fork on both the forward load wheel assembly and the central load wheel assembly.

10. The pallet truck of claim 8 wherein the first activation arm is further movable to pivot the central load wheel assembly to lift and support the at least one fork on the central load wheel assembly, wherein the pallet truck has a second turning radius relating to the distance between the wheel rotatably connected to the base support portion and the central load wheel assembly.

11. The pallet truck of claim 10 wherein when the at least one fork is lifted and supported by the central load wheel assembly, the forward load wheel assembly hangs from the at least one fork.

12. The pallet truck of claim 7 further comprising a biasing element configured to bias the central load wheel assembly toward a raised position.

13. The pallet truck of claim 12 wherein the biasing element has a first end connected to the central load wheel assembly and a second end connected to the at least one fork.

* * * * *